(12) United States Patent
Newburn et al.

(10) Patent No.: US 7,512,750 B2
(45) Date of Patent: Mar. 31, 2009

(54) PROCESSOR AND MEMORY CONTROLLER CAPABLE OF USE IN COMPUTING SYSTEM THAT EMPLOYS COMPRESSED CACHE LINES' WORTH OF INFORMATION

(75) Inventors: Chris J. Newburn, South Beloit, IL (US); Ram Huggahalli, Portland, OR (US); Herbert H J Hum, Portland, OR (US); Ali-Reza Adl-Tabatabai, Santa Clara, CA (US); Anwar M. Ghuloum, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 10/750,715

(22) Filed: Dec. 31, 2003

(65) Prior Publication Data

US 2005/0144388 A1 Jun. 30, 2005

(51) Int. Cl.
*G06F 12/00* (2006.01)
(52) U.S. Cl. .......................................... 711/154; 341/51
(58) Field of Classification Search ................... 711/156
See application file for complete search history.

(56) References Cited

U.S. PATENT DOCUMENTS

| | | | |
|---|---|---|---|
| 5,206,939 A | 4/1993 | Yanai et al. | |
| 5,237,675 A | 8/1993 | Hannon | |
| 5,247,638 A | 9/1993 | O'Brien et al. | |
| 5,652,857 A | 7/1997 | Shimoi et al. | |
| 5,732,202 A * | 3/1998 | Okamoto | 358/1.18 |
| 5,875,454 A | 2/1999 | Craft et al. | |
| 6,092,071 A | 7/2000 | Bolan et al. | |
| 6,115,787 A | 9/2000 | Obara | |
| 6,145,069 A | 11/2000 | Dye | |
| 6,199,126 B1 | 3/2001 | Auerbach et al. | |
| 6,449,689 B1 | 9/2002 | Corcoran et al. | |
| 6,507,895 B1 | 1/2003 | Wang et al. | |
| 6,523,102 B1 | 2/2003 | Dye et al. | |
| 6,629,205 B2 | 9/2003 | Cypher | |
| 6,640,283 B2 * | 10/2003 | Naffziger et al. | 711/118 |
| 6,735,673 B2 * | 5/2004 | Kever | 711/118 |
| 6,825,847 B1 * | 11/2004 | Molnar et al. | 345/555 |
| 2001/0001872 A1 * | 5/2001 | Singh et al. | 711/129 |

(Continued)

OTHER PUBLICATIONS

Mason, K., Cache system having ability to store compressed and uncompressed data lines, IBM, Research Disclosure Publicaations, vol. 454, No. 150, Feb. 2002, XP007129887, ISSN: 0374-04353.

(Continued)

*Primary Examiner*—Kevin Ellis
*Assistant Examiner*—Hashem Farrokh
(74) *Attorney, Agent, or Firm*—Blakely, Sokoloff, Taylor & Zafman LLP

(57) ABSTRACT

A memory controller is described that comprises a compression map cache. The compression map cache is to store information that identifies a cache line's worth of information that has been compressed with another cache line's worth of information. A processor and a memory controller integrated on a same semiconductor die is also described. The memory controller comprises a compression map cache. The compression map cache is to store information that identifies a cache line's worth of information that has been compressed with another cache line's worth of information.

33 Claims, 16 Drawing Sheets

U.S. PATENT DOCUMENTS

| | | | |
|---|---|---|---|
| 2001/0054131 | A1 | 12/2001 | Alvarez et al. |
| 2002/0040413 | A1 | 4/2002 | Okada et al. |
| 2002/0091905 | A1 | 7/2002 | Geiger et al. |
| 2002/0116567 | A1 | 8/2002 | Vondran |
| 2003/0131184 | A1 | 7/2003 | Kever |
| 2003/0135694 | A1 | 7/2003 | Naffzieger et al. |
| 2003/0191903 | A1* | 10/2003 | Sperber et al. ............... 711/144 |
| 2003/0217237 | A1 | 11/2003 | Benveniste et al. |
| 2003/0233354 | A1* | 12/2003 | Bernhard et al. ................ 713/1 |
| 2004/0030847 | A1* | 2/2004 | Tremaine .................... 711/154 |
| 2004/0161146 | A1* | 8/2004 | Van Hook et al. ........... 382/166 |
| 2004/0255209 | A1 | 12/2004 | Gross |
| 2005/0114601 | A1 | 5/2005 | Ramakrishnan |

OTHER PUBLICATIONS

Kim, et al., "Low-Energey Data Cache Using Sign Comprssino and Cache Line Disection," ACM/IEEE 2nd Annual Workshop on Memory Performance Issues (WMPI 2002), May 2002.

First Foreign Office Action from Counterpart Chinese Patent Application No. 200480039058.1 mailed Jun. 22, 2007, English Translation included (9 pgs.).

Abali, B., et al., IBM Research Report "Performance of Hardware Compressed Main Memory", RC 21799 (98138) Jul. 19, 2000, Computer Science/Mathematics, Research Division, Cover page plus pp. 1-12, IBJ T.J. Watson Research Center, P.O. Box 218, Yorktown Hights, NU 10598.

Alameldeen, A., "Adaptive Cache Compression for High-Performance Processors", 31st Annual International Symposium on Computer Architecture (ISCA-31), Munich Germany, Jun. 19-23, 2004, pp. 1-12.

Abali, B., et al., "Performance of Hardware Compressed Main Memory", 9 pages, IBM T.J. Watson Research Center, P.O. Box 218, Yorktown Heights, NY 10598.

Abali, B., et al., "Memory Expansion Technology (MXT): Software Support And Performance", IBM J. Res. & DEv., vol. 45, No. 2, Mar. 2001, pp. 287-301.

Franaszek, P.A., et al., "Algorithms And Data Structures Fro Compressed-Memory Machines", IBM J. Res. & Dev., vol. 45, No. 2, Mar. 2001, pp. 245-258.

Abali, B., et al., "Hardware Compressed Main Memory: Operating system Support and Performanace Evaluation", IEEE Transactions on Computers, vol. 50, No. 11, Nov. 2001, pp. 1219-1229.

Hallnor, E., et al., "A Compressed Memory Hierarchy Using An Indirect Index Cache", 2004, Cover Sheet plus pp. 2-17, Advanced Computer Architecture Laboratory, EECS Department, University of Michigan, Ann Arbor, MI 48109-2122.

* cited by examiner

READ METHODS

PROCESSOR AND MEMORY CONTROLLER CAPABLE OF USE IN COMPUTING SYSTEM THAT EMPLOYS COMPRESSED CACHE LINES' WORTH OF INFORMATION

FIELD OF THE INVENTION

The field of invention relates generally to computing systems; and, more particularly, to a processor and memory controller capable of use in computing system that employs compressed cache lines' worth of information.

BACKGROUND

FIG. 1 shows a portion of an architecture for a basic computing system that includes: 1) a processor 101; 2) a cache 102; 3) a memory controller 103; and, 4) a system memory 104. The processor 101 implements software routines by executing instructions that perform various operations on elements of data. The instructions and data elements are stored in the cache 102 and/or system memory 104. When the processor 101 needs a specific instruction or data element it looks to the cache 102 for the desired instruction or data element before requesting it from system memory 104.

Generally, cache 102 is deemed to be "faster" than the system memory 104. Better said, the processor 101 waits less time waiting for an instruction or data element that resides in the cache 102 than an instruction or data element that resides in the system memory 104. This disparity in waiting time as between the cache 102 and system memory 104 typically arises as a consequence of the cache 102 being implemented with inherently faster memory cells (e.g., SRAM cells) than those of which the system memory is implemented (e.g., DRAM cells).

Per bit of storage space an SRAM type cache 102 is more expensive than a DRAM type system memory 104. The computing system architecture of FIG. 1 therefore attempts to optimize both cost and performance by being designed to store more frequently used instructions and data elements in the cache 102 and less frequently used instructions and data elements in the system memory 104. By storing the more frequently used instructions and data elements in the cache, the processor should endure acceptable "timing penalty hits" in the form of wasted time waiting for instructions/data to be fetched from system memory 104 because a significant percentage of the instructions/data needed by the processor will be found in the cache 102.

In order to enhance the percentage of "cache hits" (i.e., the instances where a needed instruction or data element is found the cache 102), notions of "temporal locality" and "spatial locality" come into play. Temporal locality is the notion that a single instruction or data element is apt to be used soon after it has already been used. Spatial locality is the notion that instructions and data elements that are located near each other in memory (i.e., have similar addresses) tend to be used at about the same time. Temporal locality is accounted for by keeping instructions and data elements in cache 102 for at least some period of time after they are first transferred from system memory 104 into cache 102.

Spatial locality is accounted for by designing the cache 102 to be loaded with a block of data from system memory 102 (i.e., multiple instructions or data elements) whose content is proximate to (e.g., "surrounds") any single instruction or data element that needs to be fetched from system memory 104. For example, if an instruction at address X is needed from system memory 104, instead of transferring only the needed instruction from system memory 104, instead of transferring only the needed instruction from system memory 104 to cache 102, a block of content corresponding to a plurality of addresses that are related to address X is transferred from system memory 104 to cache 102.

FIG. 2 attempts to depict such a situation by showing that a first contiguous "block" of content 105 (which is referenced through multiple system memory addresses) is loaded into a single cache line 107; and, that a second contiguous "block" of content 106 (which is referenced through a different set of multiple system memory addresses) is loaded into another single cache line 108. For simplicity, FIG. 2 shows the cache 204 as a single structure. Various computing systems are designed with different levels of cache, however. For example, many types of computing systems have two levels of caches (a level one (L1) cache and a level two (L2) cache) where the first level cache (L1) corresponds to less processor waiting time than the second level cache (L2). The L1 cache is supposed to store the most frequently used data elements and instructions while the L2 cache is supposed to store data elements and instructions that are used less frequently than those in L1 cache but more frequently than those in system memory.

Traditionally, both cache levels are implemented with a faster memory type as compared to system memory (e.g., both L1 and L2 cache are implemented with SRAM memory cells); however, the L1 cache is integrated onto the same semiconductor die as the processor while the L2 cache is implemented with different semiconductor die than the processor. As "on chip" cache accesses are faster than "off chip" cache accesses, accesses to the L1 cache correspond to less waiting time for the processor than accesses to the L2 cache.

The memory controller 103 is responsible for taking requests from the processor 101 for data, that are not satisfied by the cache, and managing the process of servicing those requests in system memory 104. There may be many different kinds of requests, such as load requests for data that is not present in the cache, and evictions of data from the cache that need to be stored back into memory. Typically, the memory controller is able to pipeline requests, so that many requests may be outstanding, and can be serviced in parallel with a much shorter average latency. The memory controller is responsible for interfacing with the details of a particular memory technology, and isolates the system memory from the processor in a modular fashion. The memory controller may either be integrated with the processor, e.g. on the same die, or may be separated, e.g. in a chipset.

The system memory is typically implemented with a specific type of system memory (e.g., EDO RAM, SDRAM, DDR, etc.).

FIGURES

The present invention is illustrated by way of example, and not limitation, in the figures of the accompanying drawings in which like references indicate similar elements and in which.

DETAILED DESCRIPTION

Compression of Cache Lines' Worth of Information

Figure 1:
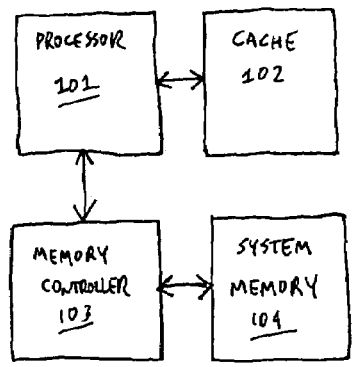
FIG. 1 shows a portion of a computing system's architecture.
Figure 2:
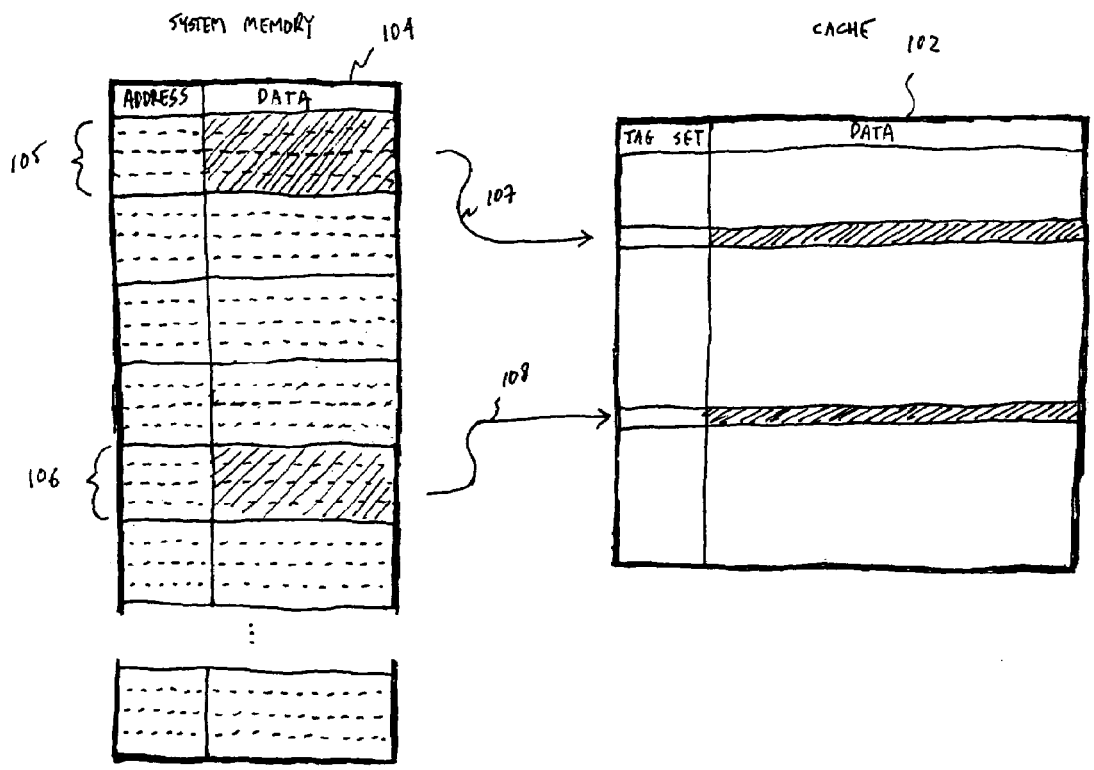
FIG. 2 shows that a block of content from system memory is loaded into a single cache line.

As a matter of clarification, a cache line is a basic unit of storage space in a cache. For example, in many applications a unique tag and set address are used to specially identify a single cache line within a computing system's cache. A cache line is therefore implemented with specific electrical circuitry elements (e.g., SRAM cells). By contrast, "a cache line's worth of information" or "line of information" is an amount of information (e.g., data elements or instructions) that can fill a cache line. Here, recalling the discussion of FIG. 2, the amount of information stored at "block" 105 corresponds to a cache line's worth of information because the content of block 105 fills cache line 107.

Figure 3A:
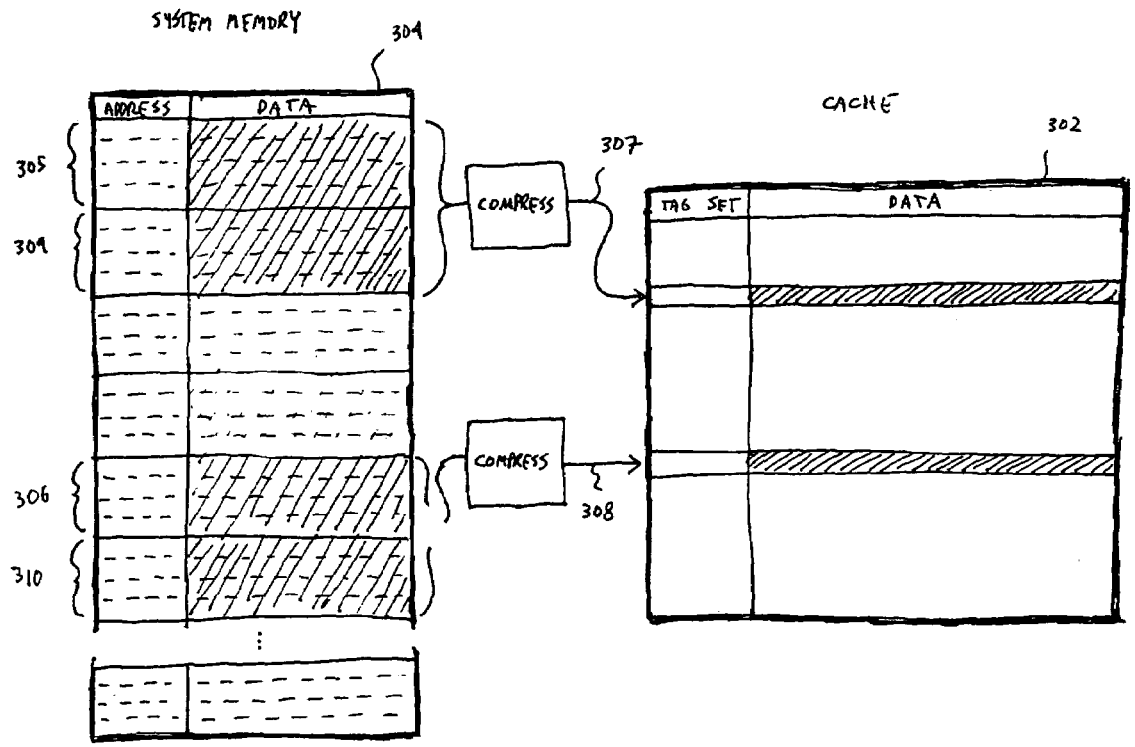
FIG. 3a shows an improved approach in which aligned blocks of system memory content can be compressed into a single cache line.

FIG. 3a demonstrates an approach that expands upon the notion of spatial locality so as to compress, into a single cache line 307, a pair of aligned system memory 304 blocks 305, 309 that would ordinarily occupy a pair of cache lines (i.e., the information of a pair of cache lines' worth of information are compressed into a single cache line). A second instance is also observed in FIG. 3a in which the content of another pair of aligned memory blocks 306, 310 that would ordinarily occupy a pair of cache lines are compressed together so as to occupy a second single cache line 308.

Compression is a technique that reduces the amount of data needed to express information (such as an instruction or a data element) without impacting the substantive content of the message itself (i.e., without eliminating the ability to recapture the "number" used to represent the instruction or data element). The ability to compress a pair of aligned blocks into a single cache line should result in faster computing system performance because the effective size of the cache is increased (; and, therefore, the likelihood of needing to incur the longer access latency to a slower cache level or system memory is decreased). Moreover, as described in more detail below, computing system bandwidth can be enhanced by suppressing access to information because it is compressed with other information that already been accessed.

Figure 4A:
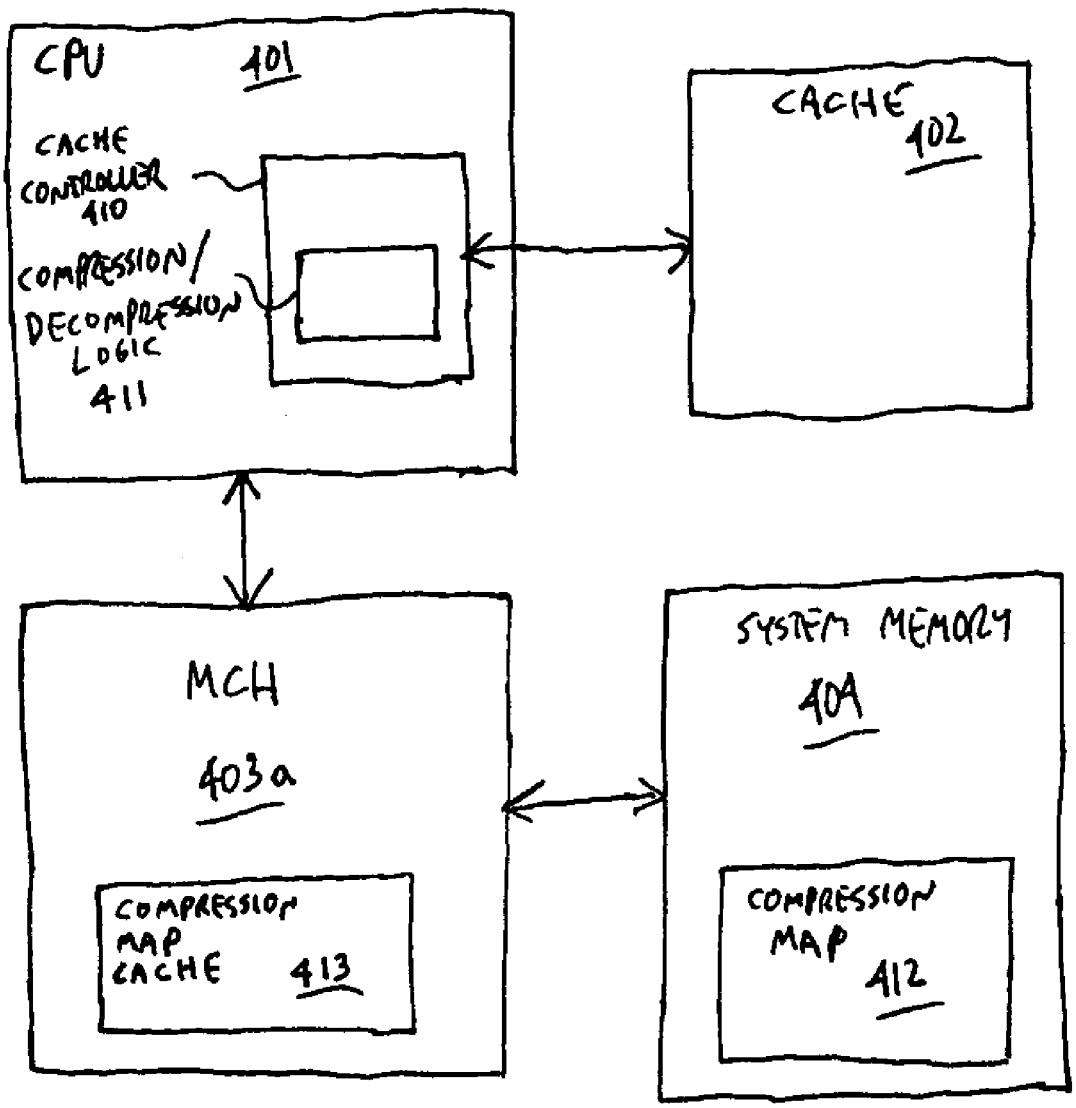
FIG. 4a shows a portion of a single processor architecture capable of using compressed cache lines.

In an embodiment, referring to FIG. 3a and FIG. 4a, the processor's cache controller 410 is fitted with compression/decompression logic 411 that compresses two cache lines worth of information together if: 1) the cache lines worth of information represent aligned, contiguous blocks of memory; and, 2) the informational content of the pair of the cache lines worth of information is capable of compression into a single cache line. The type of compression employed may take on various forms such as Lempel-Ziv, Wilson-Kaplan, X-Match or perhaps other known or proprietary types of compression.

In an embodiment, to say that companion blocks are aligned means that the lowest address associated with the companion blocks is a multiple of the combined size of the companion blocks. For example, if each cache line's worth of information is 64 bytes, then the base address, N, of two contiguous cache lines worth of information (i.e., a first at N referred to as the "lower" cache line worth of information and a second at N+64 referred to as the "higher" or "upper" cache line worth of information) is divisible by 128 (i.e. the remainder of N/128 is 0). As a further example, referring to FIG. 3a, block 305 would be addressable with a base address of N; and, block 309 would be addressable with an address of N+64.

For convenience, aligned contiguous cache lines worth of information are referred to as "companions" of one another. Thus, in light of the preceding paragraph, a pair of companion cache lines' worth of information are compressed by the compression/decompression logic 411 if their substantive content is capable of compression. Likewise, the compression/decompression logic 411 is capable of decompressing a compressed cache line worth of information into two separate companion cache lines' worth of information if a write occurs to the content of a cache line that causes the content to no longer be compressible into a single cache line.

Once a pair of cache lines' worth of information have been compressed together they are treated by the entire computing system as a single cache's line worth of information (e.g., by being referenced with a single tag and set address while being stored within a cache) until a write occurs to the compressed information that causes it to be deemed no longer compressible. Upon being deemed non compressible, the information is split into a pair of companion cache lines. Thus, if the processor 401 continually accesses from cache 402 a specific cache line's worth of compressed information, the processor 401 continually reads only a single cache line even though the informational equivalent of a pair of cache lines are actually being read. Toward the end of this detailed description are details regarding exemplary compression/decompression logic implementation(s) that may be instantiated, for example, in a processor whose cache is capable of compressing/decompressing cache lines' worth of information.

Once information has been compressed into a single cache line's worth of information, the single cache line's worth of information may be treated as any "normal" uncompressed cache line of information such as: 1) being read/written from/to a cache (including a particular level of cache); 2) being read/written from/to a system memory; and, 3) any structure designed to transport a cache line's worth of information (such as, to name a few: a front side bus or point-to-point link that transports cache lines' of information between a processor and a memory controller that controls access to a system memory; and, in a multiprocessor environment, a pair of processors that share cached information).

Figure 3B:
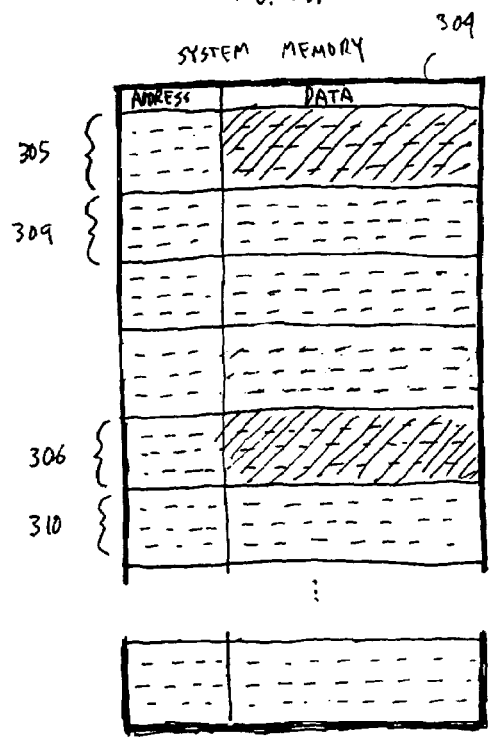
FIG. 3b shows an exemplary resulting map of substantive system memory content after compressed cache lines are evicted from cache and stored into system memory.

As an example of a possible transfer of a cache line's worth of compressed information, referring to FIG. 4a, consider a situation where a cache line's worth of information is evicted from the cache 402 (e.g., because it has not been used frequently enough to be deemed worthy of continued storage in the cache 402) and transferred to system memory 404. Here, the cache line's worth of compressed information can be stored in the system memory addressing space of a single block that can store a single cache line's worth of information. For example FIG. 3b shows a depiction of the utilization of system memory 304, with respect to the substantive content of blocks 305 and 309 of FIG. 3a, after the compressed content of cache line 307 has been evicted from the cache 302, 402. FIG. 3b shows that upon eviction from cache 302, 402 and storage into system memory 304, 404 the content of cache line 307 is stored so as to occupy only memory block 305. This is in stark contrast to the utilization of the system memory that existed prior to compression, shown in FIG. 3a, for storing the same amount of information.

Note that even though two cache lines' worth of data may be stored in the space normally occupied by a single cache line's worth of data, when stored in system memory in compacted form, this does not imply an effective increase in system physical memory capacity, as is true for compressed caches. This is because in system memory, the address space is not compacted. Compacting the address space requires modifications to page tables and thus it requires operating systems support, which the schemes presented here are capable of avoiding entirely.

That is, after compression only block 305 is needed to store the informational content of that which was earlier stored in blocks 305 and 309 prior to compression. FIG. 3b also demonstrates that, upon eviction, the compressed contents of cache line 308 are restored in system memory 304 so as to only occupy block 306 even though blocks 306 and 310 were used to store the same information prior to compression. If one of the "compressed content" blocks 305, 306 of FIG. 3b is needed again by the processor 401, it is read from system memory 304, 404 by memory controller 403a as a single cache line's worth of information and is transferred (again as a single cache line's worth of information) from memory controller 403a to processor 401 and written (again as a single cache line's worth of information) into the processor's cache 402.

Memory Controller

In the context of single processor environments the memory controller may behave largely without any recognition or cognizance of the compression/decompression activity taking place. That is, for example, the processor 401 may "keep track of" and manipulate those cache lines worth of information that are compressed and those that are not compressed; and, by contrast, the memory controller is designed to simply read and write blocks of data in accordance with identifiers or labels assigned by the processor 401.

However, a more sophisticated memory controller 403a that takes into account which blocks of system memory are used to store content that corresponds to compressed cache lines worth of information (and/or which blocks of system memory are used to store content that corresponds to non-compressed cache lines worth of information) may be able to reduce the demand for system memory accesses so as to make the system memory's usage more efficient within the computing system. For example, by refusing to read a second block of data because its substantive content has just been read from a compressed, first block of data, the demand that is exercised on the system memory is effectively reduced.

As a more detailed example, consider a multiprocessor environment where the processors are capable of compressing information into its cache lines. Here, a first processor (e.g., processor 401 in FIG. 4a) may compress information into a cache line and then subsequently evict it from its cache 402 so that it is stored into system memory 404. If a second processor in the multi-processor system (not shown in FIG. 4a), without knowledge of the first processor's compression activity, desires to read from system memory 404 information stored in both companions of the compressed information, the memory controller 403a may be designed to be "smart enough" to only read the compressed cache line's worth of information in response to receiving a pair of read requests from the second processor (i.e., a first request for the first companion and a second request for the second companion). Here, the compressed cache line's worth of information will be sufficient to satisfy both requests made by the second processor.

Compression Map

Figure 4B:
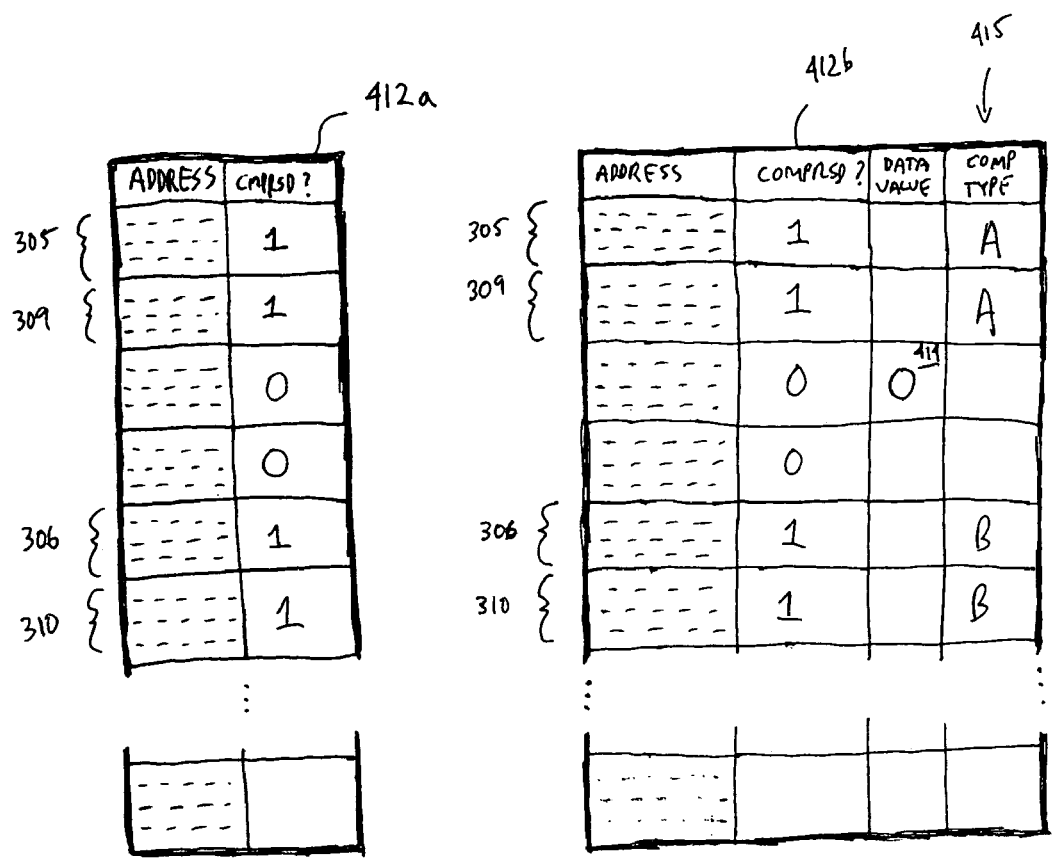
FIG. 4b shows a compression map that can be utilized by a system memory controller to keep track of those blocks within its system memory that have been compressed.
Figure 4B:
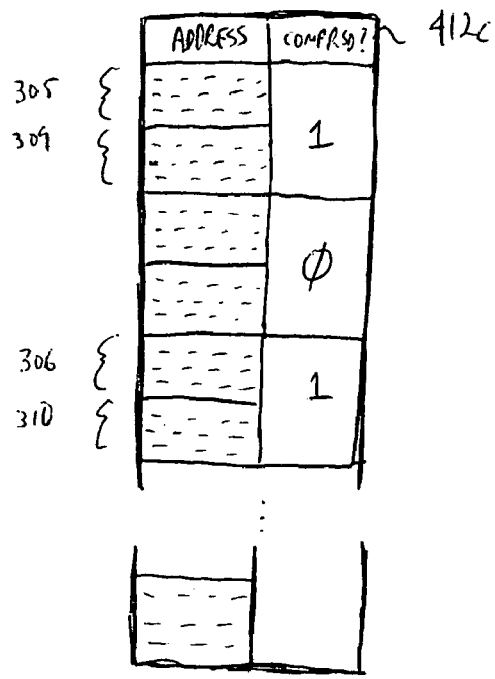

FIG. 4b provides a trio of embodiments 412a, 412b, 412c for a body of information, referred to as a compression map 412, that may be used by the memory controller 403a to recognize the existence of compressed information within its system memory 404. Firstly, referring to "basic embodiment" 412a, note that the compression map 412a may be stored as a bit map in system memory 404 that identifies, for each block of information in system memory 404, whether that block's corresponding cache line's worth of information is currently stored in system memory 404 in a compressed format or in a non-compressed format.

In typical implementation, an address column is not actually included in the compression map (e.g., in cases where the map covers the whole memory). FIG. 4b shows an address column in each of embodiments 412a, 412b, 412c so that the reader can easily understand a compression map's organization and structure. Specifically, bits have been provided an active value "1" (while others have not been provided an inactive value "0") in the context of examples that are based upon the system memory shown in FIG. 3b and that are discussed immediately below. As such, the compression map may be implemented as a data structure being organized to have specific values at locations (e.g., data fields) that correspond to specific system memory blocks.

Compression map embodiment 412a of FIG. 4b is depicted so as to apply to the system memory observed in FIG. 3b. Specifically, recall that the system memory of FIG. 3b stores information in block 305 that corresponds to the compression of information that existed in blocks 305 and 309 prior to compression. Because the information of blocks 305 and 309 of FIG. 3a have been compressed together, the compression map 412a of FIG. 4a provides an indication (a "1") for each of these blocks 305, 309. Likewise, because the information of blocks 306 and 310 of FIG. 3a have been compressed together (into block 306), the compression map 412a of FIG. 4b provides an indication for each of these blocks as well 305, 309. Referring to FIG. 4a, note that the compression map 412a may be stored in the system memory itself 404.

A "more elaborate" compression map embodiment 412b of FIG. 4b includes bitmap information as described above with respect to embodiment 412a as well as additional information in the form of: 1) information (e.g., in select cases such as instance 414) that provides the substantive content of a cache line's worth of information; 2) indication(s) 415 of the type of compression used for each cache line's worth of information that is stored in a compressed format.

The former additional information 414 corresponds to an extreme form of compression that may be applied: a) to the content of system memory blocks having non-compressed cache lines' worth of information; and/or b) "on top of" those cache lines' worth of information that are already stored in system memory in a compressed format (embodiment 412b indicates a single instance of the former). For example, if the cache line's worth of information that is stored in a particular system memory block is "all zeroes"; then, a single "zero" (e.g., zero 414) may be stored at the particular block's location in the compression map 412b. Similar indications may be used for any type of constant value (e.g., "all 1s"). Here, the memory controller would be expected to include logic (such as summation logic (e.g., the sum of all zeroes will be zero)) that identifies those cache lines having a constant value.

The later form of additional information 415 indicates a specific type of compression. Here, recall that different types of compression may be employed (e.g., Lempel-Ziv, Wilson-Kaplan, X-Match, etc.). Not only may compression of only a single type exist within any one particular computing system (e.g., a single system that only uses Lempel-Ziv); but also, embodiments may also be crafted where a single system is capable of implementing different types of compression (e.g., a single system that can use any of the Lempel-Ziv, Wilson-Kaplan, X-Match and perhaps other compression algorithms).

Both of the compression map embodiments 412a, 412b show a bit that provides compressed/uncompressed status for each aligned block in system memory that can store a cache line's worth of information. By contrast, embodiment 412c uses only one bit to represent the compressed/uncompressed status of each pair of aligned system memory blocks. Here it is worthy to note that compression ratios other than 2:1 may be employed (such as 4:1); and that, the size of a compression map that is implemented according to the approach of embodiment 412c will become smaller as the compression ratio increases. That is, for 2:1 compression, a bit is used to represent every aligned pair of memory blocks; while, if a 4:1 compression ratio were used, there would be a bit for every group of four aligned memory blocks. Note also that the more elaborate information of embodiment 412b can be added to embodiment 412c.

Alternate embodiments of the compression map could use selective, hierarchical schemes, rather than a flat bit vector. A flat bit vector must have one bit for every block in memory. Compression may be applied selectively to only certain regions of memory, and thus the compression map could be made to cover only those regions of memory that are subject to compression. Likewise, compression may actually have occurred (so far) in only a subset of memory regions, even though additional regions may be subject to compression. The various sections of the compression map that cover the regions which have been fully or partially compressed can be linked together as a linked list, or worked into a hierarchy of data structures that cover progressively smaller regions and sub regions of memory.

Recalling that a condition for the compression of a pair of companions is that the substantive content of the companions "be compressible" into a single cache line's worth of information, and owing to the different mathematical techniques employed across different compression schemes, a particular compression technique may regard a pair of particular companions to be compressible while other compression schemes may not regard the same companions to be compressible (e.g., the substantive content of a pair of companions may be compressible under Lempel-Ziv but not under Wilson-Kaplan or X-Match). As such, more companions are likely to be compressed in a computing system that "offers" different types of compression as compared to a computing system that offers only a single type of compression. The compression type indication 415 of the enhanced bit map embodiment 412b of FIG. 4b can be used in such a system (noting that it indicates compression type "A" was used for blocks 305, 309 and compression type "B" was used for blocks 306, 310). Therefore, compression/decompression logic 411 of FIG. 4a should be understood to be capable of performing singular or multiple types of compression depending on the particular embodiment.

Also, note from FIG. 4a that the compression map may be stored in system memory 404. In an embodiment, the memory controller 403a is designed to fetch a portion of the compression map 412 from system memory 412 at an appropriate moment to check upon the compression/decompression status of one or more system memory blocks.

In order to reduce the efficiency penalty associated with accessing system memory 404 in order to fetch a portion of the compression map 412, note also that the memory controller 403a is designed to include a compression map cache 413. The compression map cache 413 contains one or more recently fetched portions of the compression map. Similar to a normal cache, compression map information may be continuously updated in the compression map cache 413 until evicted to system memory 404. As described in more detail below with respect to FIGS. 5a through 5d, the compression map cache 413 is referred to when compression map information is desired. If the desired information is not found in the compression map cache 413, the information is fetched from the compression map 412 that resides in system memory 404.

Figure 4C:
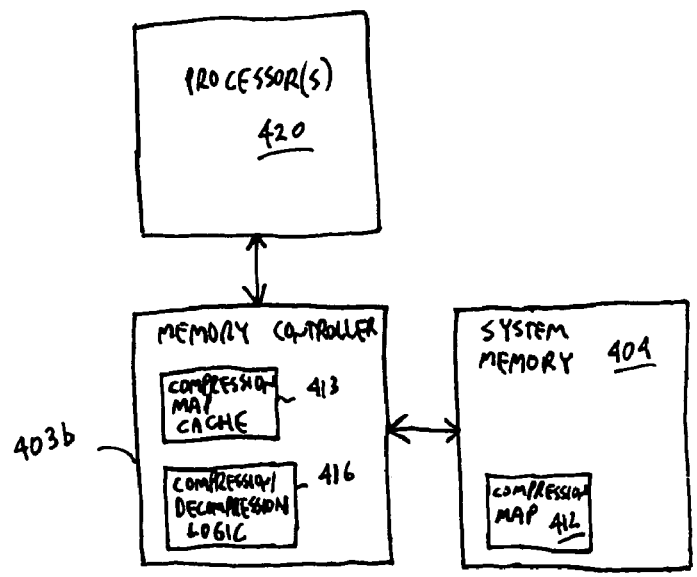
FIG. 4c shows a memory controller having a compression map cache and compression/decompression logic.

FIG. 4c demonstrates that a memory controller 403b configured to work with a compression map 412 may be instrumented not only in a computing system having a single processor 420; but also, with one or more processors (such as processor 420 and perhaps other processors not shown in FIG. 4c) that do not possess the ability to compress/decompression their cached information. Thus, the memory controller 403b of FIG. 4c is capable of being the main (and perhaps only) component in the computing system that is conscious of any compression activity. The depiction of FIG. 4c therefore, in contrast to FIG. 4a, shows that the memory controller 403b itself can be retrofitted with the appropriate compression/decompression logic 416 used for compressing and decompressing cache lines (noting also that processor 420 is devoid of such logic). The compression/decompression logic 416 may support one or more types of compression/decompression techniques.

The memory controller 403b may further include a compression map cache 413 as described above in reference to FIG. 4a. In working with processor(s) that do not maintain any cognizance of compression/decompression activity, the memory controller 403b presents/receives uncompressed cache lines worth of data to/from the processor(s). Specific methodologies that may be executed by a memory controller 403b that is operating in an environment where the processor (s) can't operate with compressed cache lines are described in more detail further below.

Figure 4D:
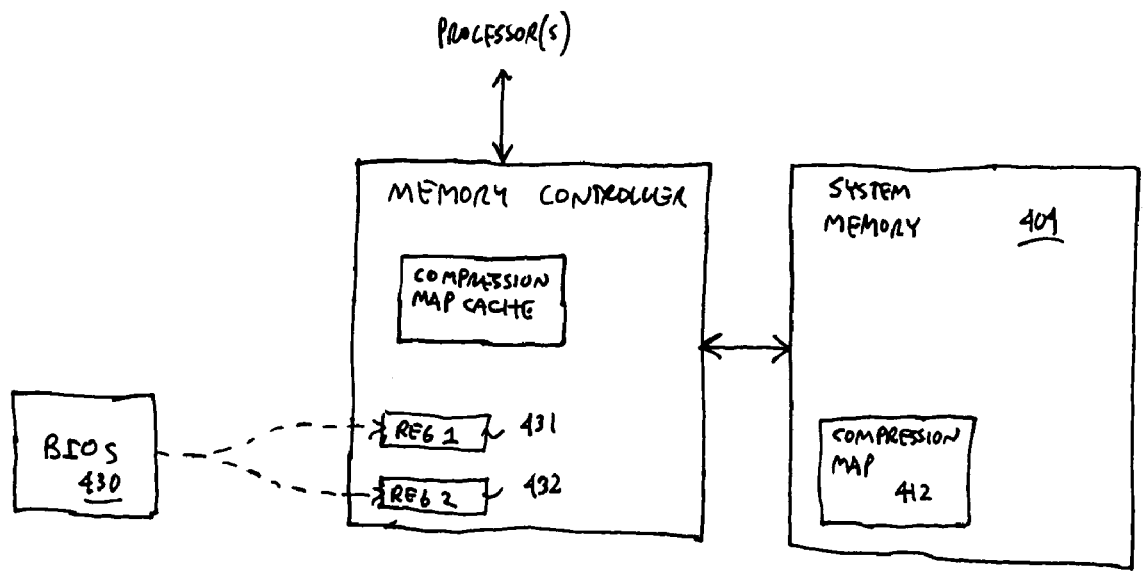
FIG. 4d shows a memory controller having register space for identifying physical system memory allocation for a compression map.

FIG. 4d is meant to convey that the compression map 412 may be stored within a "physical" continuous addressing range of the system memory 404 rather than being implemented in a "virtual" fashion across unrelated memory locations (with, for example, link listing techniques that are managed in software). By implementing the compression map 412 across a physical addressing space, the Operating System (OS) may operate without awareness of the compression/activity; which, in turn, saves the OS from being bogged down with executing instructions for managing or recognizing which locations of system memory 404 are to be used for the compression map 412. As such, a significant degree of overhead is avoided from being imparted upon the OS.

By configuring the compression map to be implemented across a physical range of the system memory's addressing space, the compression map should also be capable of being managed and controlled by the computing system's hardware rather than its operating system. As discussed above, this should "free up" the OS so as to be substantially unburdened with overhead relating to the compression map. In an embodiment, the Basic Input Output System (BIOS) 430 indicates what specific physical address range of the system memory 404 is to be used for the compression map 412 by causing a pair of registers 431, 432 to be written into. For example, a first address might be stored into register 431 that defines the starting address of the compression map; and, a second address might be stored into register 432 that defines the ending address of the compression map.

Alternatively, the size of the compression map might be stored into one of registers 431, 432 while a starting or ending address is stored in the other of registers 431, 432 (noting that the size of the compression map might vary depending on whether 2:1, 4:1 or another compression aspect ratio is employed). Subsequent to the loading of registers 431 and 432 the hardware is capable of refraining from storing non compression map information into the addressing space identified through registers 431 and 432; and, likewise, directing the compression map only toward the same addressing space. The registers 431, 432 may alternatively be located in a processor.

If the compression map is physically distributed across multiple local memories, or a compression map scheme is used that does not require each portion of the compression map to reside in physical contiguous memory, more than one pair of registers may be used to communicate from the BIOS to the hardware where the compression map resides.

It is also worthwhile to note that storing the compression map across a contiguous physical address range that is hidden from, and not paged by, the operating system should permit the compression map to be referenced using physical addresses without having to handle changes in the virtual address and page faults that may occur as the operating system swaps pages out of physical memory and into virtual memory and back again. This is another way in which this scheme avoids the need for OS support, and is transparent to software.

Compression Map Uses

As discussed above, the compression map represents whether particular cache lines' worth of information stored in main memory are compressed or uncompressed. In various embodiments it is updated with each write to memory that changes the compression state of that memory. A compression map can be used for at least the following three purposes: 1) to effectively change the target address of an upper cache line's worth of information that has been compressed in a non-duplicative scheme; 2) to decide whether a cache line's worth of information that has just been read from system memory should be decompressed or not by a memory controller that performs decompression; and, 3) to suppress a system memory access if requests for separate companions are recognized and the companions have been compressed. Each of these are discussed more fully below in the context of writes to system memory and reads from system memory.

System Memory Writes

Figure 5A:
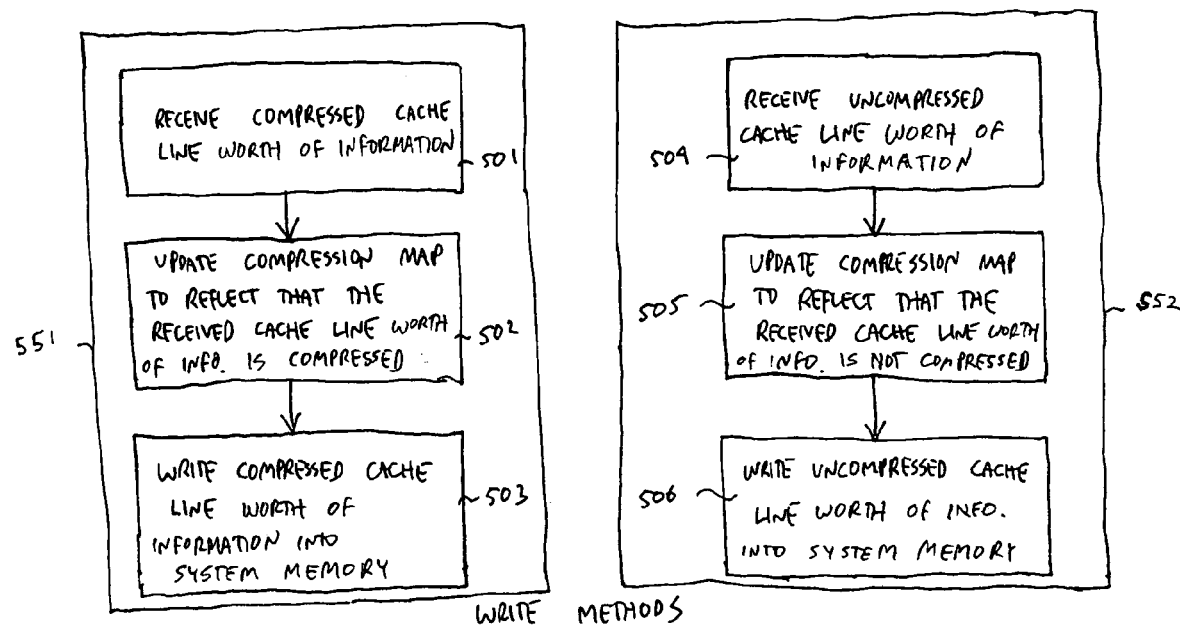
FIG. 5a shows a pair of methods that can be utilized by the memory controller of FIG. 4a during a write of a cache line into system memory.

FIG. 5a shows a pair of memory controller methods 551, 552 for writing a cache line's worth of information into a block of system memory. Each of the methods 551, 552 of FIG. 5a invoke a compression map. According to the first methodology 551, a compressed cache line's worth of information is received by the memory controller (e.g., as sent from a processor) 501. The compressed cache line's worth of information is presumed to be identified to the memory controller as being in a compressed format (e.g. with a set bit in a control header or an activated line). In response to the reception of the compressed cache line's worth of information, the memory controller updates 502 the compression map to reflect that the received cache line's worth of information is compressed. Any of embodiments 412–412c of FIG. 4b or variants thereof can be used to implement the compression map.

In order to perform the update 502, referring to FIG. 4a, the memory controller 403a refers to the compression map cache 413. If the section of the compression map that is correlated with the system memory block to which the received compressed cache line's worth of information is associated resides within the compression map cache 413; then, only the compression map cache 413 is updated (so as to avoiding accessing the compression map 412 in system memory 404). If the appropriate portion of the compression map is not within the compression map cache 413, the appropriate portion is fetched from system memory 404 and updated 502.

Note also that in an embodiment (such as that depicted in FIG. 4c) where the memory controller 403b is coupled to a processor that does not use cache lines with compressed information, process 501 would be slightly modified such that: 1) only an uncompressed cache line's worth of information would be received at box 501; 2) between boxes 501 and 502 the memory controller 403b would determine that the received cache line's worth of information is compressible with its companion (e.g., by referring to the substantive content of its companion in an inbound or outbound queue of the memory controller 403b); and, 3) prior to execution of box 503 the memory controller 403b would compress the received cache line's worth of information with its companion.

Recall that two companion cache lines worth of information correspond to a pair of aligned blocks of address space in main memory. Here, the combination of a pair of aligned blocks can be viewed as a larger "macro block" of memory space; where, one companion occupies the "lower half" of the macro block, and the other occupies the "upper half" of the macro block, when they are each uncompressed. When the companions are compressed, the substantive content of the entire macro block can be referenced with the addressing information used for only one of the smaller companion blocks (e.g., the addressing information used for the lower half of the macro block). When uncompressed, the upper and lower halves of the macro block are separately addressable.

For example, referring briefly back to FIGS. 3a and 3b, the combination of blocks 305 and 309 can be viewed as a macro block of information where block 305 corresponds to the "lower half" of the macro block (because it is referenced using the lower addressing space of the pair of blocks 305, 309) and block 309 corresponds to the "upper half" of the macro block (because it is referenced using the higher addressing space of the pair blocks 305, 309). When uncompressed, "lower half" 305 is separately addressable and "upper half" 309 is separately addressable. When compressed, the combined content of both halves can be accessed by addressing lower half 305.

The memory controller should be designed to recognize, for any uncompressed cache line's worth of information, which half of a macro block it is supposed to occupy and which half of a macro block its corresponding companion is supposed to occupy. For example, referring briefly back to FIGS. 3b and 4b, the memory controller would be designed to recognize that an uncompressed cache line's worth of information that is addressed to upper half 309 is the companion line of an uncompressed cache line's worth of information that is addressed to lower half 305. Such recognition is straightforward based upon the mathematics of the alignment scheme that defines which blocks are companions one another. For simplicity, a lower half of a macro block will hereinafter be referred to as a lower block and a higher half of a macro block will be referred to as a higher block.

For 2:1 compression ratios, a pair of embodiments are possible as to the usage of the upper and lower blocks of a macro block when its substantive content is compressed. Referring back to FIG. 5a, in a first embodiment referred to as "non-duplication", irrespective of whether a compressed cache line of information to be written into system memory was compressed by the memory controller or a processor, the write 503 of a compressed cache line's worth of information involves a write to the address space of only the lower block of the corresponding macro block. FIGS. 3a and 3b illustrate a "non-duplication" approach because, as originally discussed, if blocks 305 and 309 of FIG. 3a are compressed together, only the lower block 305 of FIG. 3b is written to (of course, alternatively, only the higher block could be written to).

According to a "non-duplication" approach, as described in more detail below with respect to methodology 555 of FIG. 5b, the memory controller refers to the compression map prior to a read because a request (e.g., by a system component that is unaware of any compression activity) for a higher block that has been compressed into a lower block can only be satisfied by reading from the lower block (i.e., the target specified in the request is different than the location in system memory from where a read is performed to satisfy the request).

In an alternative second embodiment, referred to as "duplication", the write 503 of a compressed cache line involves a write to the address space of all the blocks among the applicable companion set (e.g., both the lower and higher blocks among the applicable companion set for 2:1 compression). For example, for a 2:1 compression approach, if blocks 305 and 309 of FIG. 3a are compressed together, both blocks 305 and 309 of FIG. 3b are written to with the same compressed information. The duplication approach allows the memory controller to avoid having to retrieve information from a lower compressed block of information when a request for the upper block's information is received (as described just above with respect to the "non duplication" embodiment).

As such, the compression map does not need to be referred to for requests for "upper" blocks of information. If FIG. 3b were to be modified to reflect a duplicative approach, upper block 309 would be shaded and it would be further understood that the content of upper block 309 is the same compressed content as that stored in lower block 305. Likewise, upper block 310 would be shaded and it would be further understood that the content of upper block 310 is the same compressed content as that stored in lower block 306.

In the second memory controller write methodology 552 of FIG. 5a an uncompressed cache line is received 504 from a processor that is capable of performing compression. As such, the received, uncompressed cache line is deemed "uncompressible" for whatever reason. The compression map is therefore updated 505 (e.g., by writing a "0" in the compression map at a location that represents the uncompressed cache line's corresponding block) and written into system memory 506.

Write methodology 552 could also be slightly modified to represent a write process in systems where the memory controller performs compression/decompression (such as a system as described in FIG. 4c where the processor does not support compression). As such, unlike the immediately preceding discussion, it is unknown whether the received uncompressed cache line is compressible or uncompressible. In such a case, between boxes 504 and 505, the compression/decompression logic 416 of the memory controller decides that the received cache line is not compressible (e.g., by analyzing its content along with the content of its companion as found in an input queue or output queue of the memory controller). If it were deemed compressible, it would be compressed with its companion and write 506 would be a write of compressed information.

System Memory Reads

Figure 5B:
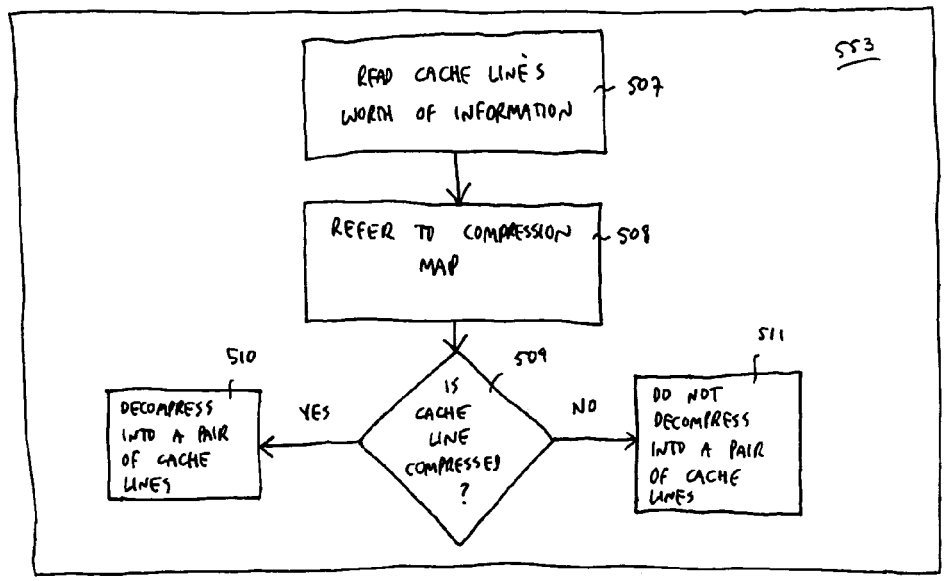
FIG. 5b shows a trio of methods that can be utilized by a memory controller during a read of a cache line from system memory.
Figure 5B:
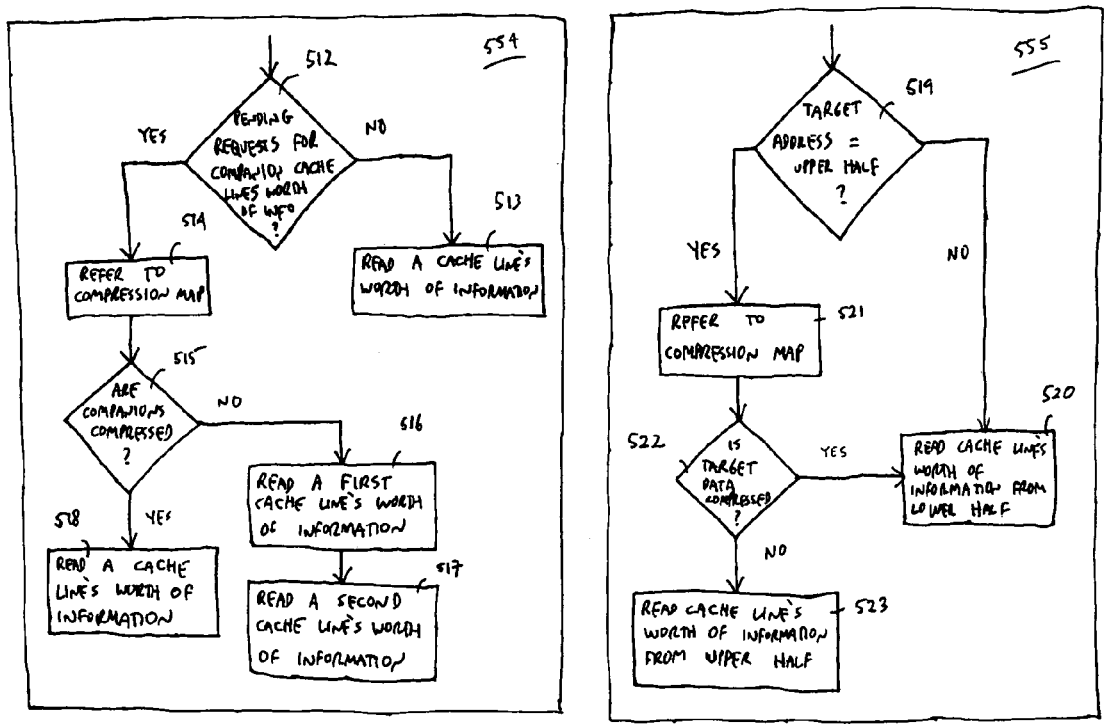

FIG. 5b shows a trio of memory controller read methods 553, 554, 555. The first read method embodiment 553 is directed to implementations, such as that depicted in FIG. 4c, where the memory controller performs the compression and decompression of cache lines and the processor(s) with whom the memory controller communicates do not use cache lines that support compressed information. As such, for any cache line's worth of information that is read 507 from system memory, the memory controller refers 508 to the compression map to see if the information being read is compressed (note that the reference 508 to the compression map is shown as being after the read 507 but may alternatively be performed in parallel with and/or prior to the read 507). If the read cache line's worth of information is compressed the memory controller decompresses it 509, 510. If the read cache line's worth of information is not decompressed the memory controller does not attempt to decompress it 509, 511.

If the memory controller happens to reside in a computing system having components that recognize the existence of compressed cache lines' worth of information; then, the memory controller may be implemented without compression/decompression logic (e.g., the environment of FIG. 4a is applicable rather than the environment of FIG. 4c). If so, the memory controller should be designed so as to simply signify whether the read information is compressed or decompressed (e.g., by adjusting a value within a header that is appended to the cache line's worth of information) rather than actually perform decompression. To represent a read process for such a memory controller, box 510 of methodology 553 of FIG. 5b should correspond to providing an indication (e.g., in a header or activated line) that the read information is compressed and box 511 should correspond to providing an indication the read information is not compressed.

Methodologies 554 and 555 may be performed by a memory controller that has compression/decompression logic or a memory controller that does not have compression/decompression logic. The second read methodology 554, which has already been briefly alluded to, involves the memory controller being designed to be "smart enough" to avoid making a second read to system memory for a companion of an already read compressed cache line's worth of information. According to this methodology, if the memory controller recognizes that there are pending read requests for cache lines' worth of information that are companions of one another, the compression map is referred to 512, 514. If the compression map reveals that the companions are compressed together the memory controller only reads 518 the compressed cache line from system memory in order to satisfy both requests.

If the compression map reveals that the companions are not compressed together, the memory controller reads both cache line's worth of information (for a 2:1 compression scheme) separately 516, 517 from their corresponding lower and upper blocks of information in order to satisfy the requests. If there are no pending read requests for cache lines' worth of information that are companions of one another the memory controller behaves like a normal memory controller and simply performs a separate read 513 from system memory to satisfy each request.

It is worthwhile to note that the term "pending" request means that the physical memory component has not, as yet, actually responded to the memory controller that issued the request. However, it is possible for the memory controller to suppress a second request even if the physical memory component has already responded to the first (i.e., the first request is no longer "pending"). For example, the memory controller could be designed to suppress any second request for compressed information provided the data for the second request can be provided (e.g. from the memory controller) from the results of the first request. Therefore, the ability to suppress requests can be extended to situations beyond those described by methodology 554 of FIG. 5b.

In cases where the memory controller is designed to perform decompression, the memory controller may perform both of read methods 553 and 554 together in a continuous flow; where: 1) methodology 554 is largely performed prior to the read, 2) methodology 553 is largely performed after the read, and, 3) any of reads 518, 517, 513 of methodology 554 also correspond to read 507 so as to "connect" methodologies 553, 554 together. If the methodologies 553, 554 are connected in this fashion note that reference 508 may be "skipped" (i.e., not performed) if reference to the compression map 514 was made prior to the memory read. This is so because the answer to inquiry 509 that methodology 553 indicates is to be performed after the read can be gleaned from reference 514 which is made prior to the read.

Methodology 555 corresponds to a write methodology that can be used to implement the "non-duplication" write approach discussed above with respect to FIG. 5a. Here, the compression map is referred to if the target address of the requested cache line's worth of information corresponds to the upper block for the companion pair 519, 521. If the requested cache line's worth of information has been compressed, the compressed cache line is read from the lower block 522, 520. If the requested cache line's worth of information has not been compressed, the uncompressed requested cache line's worth of information is read from the target block specified in the read request. If the target block specified in the read request is not the upper block, the memory controller simply reads a compressed or uncompressed cache line's worth of information from the system memory with addressing that corresponds to the lower block 519, 520 (i.e., no reference to the compression map is needed).

Similar to methodology 554, methodology 555 may be combined with methodology 553 for a memory read performed by a memory controller that also performs decompression. Here, either of reads 523 and 520 of method 555 can be viewed as read 507 of method 553 so as to connect the two methodologies 555, 553 together. If the execution of method 555 flows through compression map reference 521 prior to memory read 507, compression map reference 508 can be skipped because the answer to inquiry 509 can be gleaned from reference 521. Use of a duplicative scheme as discussed with respect to FIG. 5a removes the need for methodology 555 because no change of target address is effected with a "yes" answer to inquiry 522.

Compression Map Cache Lookup

Figure 5C:
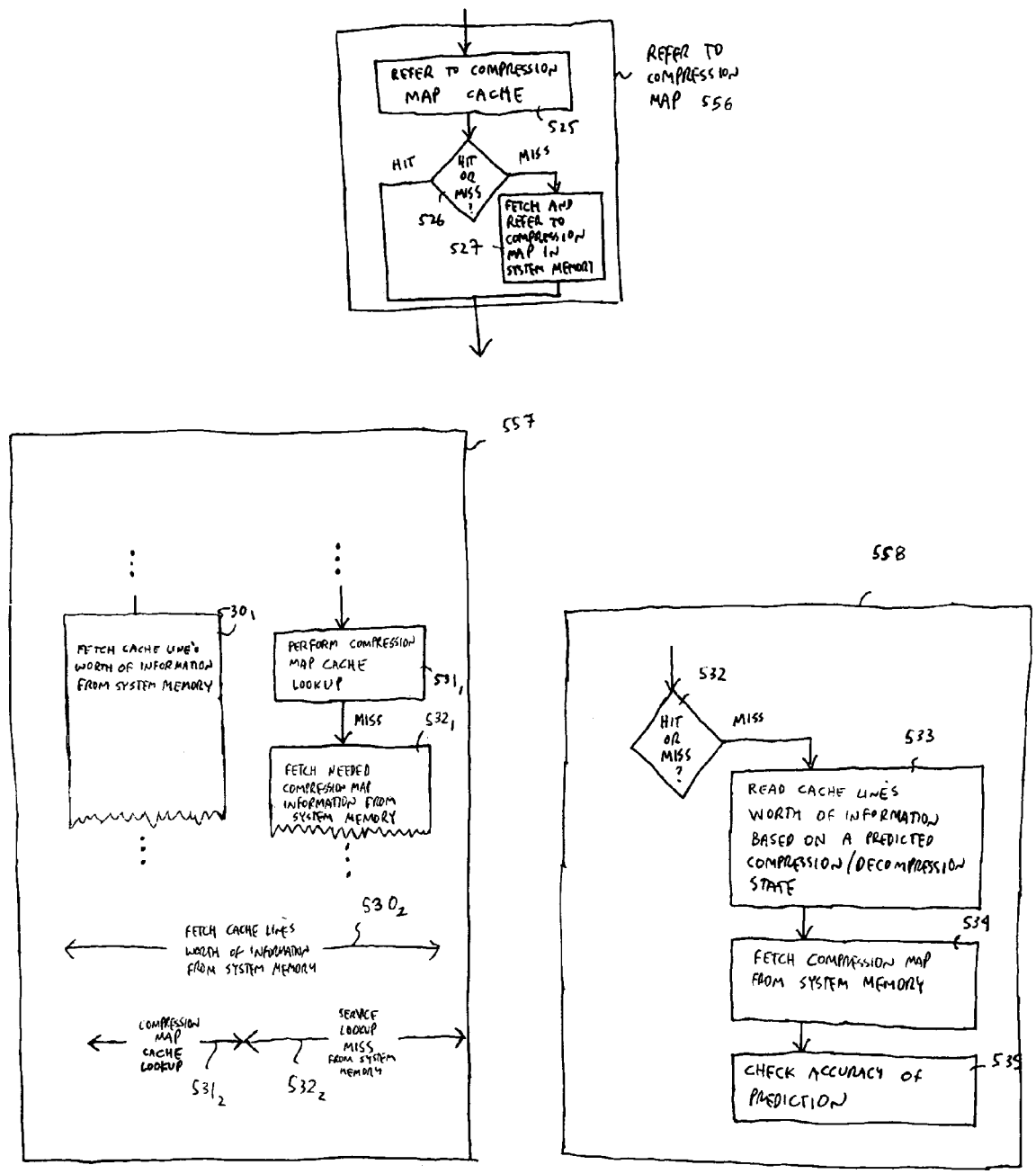
FIG. 5c shows a trio of methods related to referring to the contents of a compression map.

FIG. 5c provides a trio of methodologies 556, 557, 558 that are related to the references to the compression maps 508, 514, 521 that were discussed just above with respect to FIG. 5b. In particular, methodology 556 shows a more detailed depiction of a process that may be used to implement any of compression map references 508, 514, 521 of FIG. 5b. Methodology 556 corresponds to a basic cache/system memory read process—albeit applied with the novel features of a memory controller's compression map cache and a compression map residing in system memory. Better said, in order to refer to the compression map 556, the memory controller first refers 525 to its on-board compression map cache 413.

As the compression map cache 413 only contains a portion of the entire compression map 412 that is stored in system memory 404, if the information for the cache line is found in the compression map cache 526 (i.e., "a hit")—the reference to the compression map is complete. If the information for a particular block is not found in the compression map cache (i.e., "a miss"), the information is fetched from the complete compression map that resides in system memory 526, 527 (i.e., a read to system memory is performed).

A compression map miss corresponds to an efficiency penalty because a system memory read 527 is performed as a consequence. Methodologies 557, 558 correspond to methodologies that may be performed by the memory controller in order to mitigate the timing penalty hit associated with a compression map cache miss for either of the compression map references 514, 521 of FIG. 5b that precede a corresponding memory read 516–518, 520, 523. Both of methodologies 557, 558 apply to a memory controller that performs decompression (e.g., because it works with a processor that does not use compressed cache lines as depicted in FIG. 4c) and therefore performs methodology 553 of FIG. 5b for all system memory reads of a cache line.

Methodology 557 shows that the memory controller may be designed to perform the reference to the compression map cache 531 that occurs prior to a memory read 514, 521 in the process of satisfying a second memory read request in a time period that overlaps with the read 530 of a cache line's worth of information from system memory to satisfy a first memory read request. That is, performing the pre memory read cache lookup 531 and the memory read 530 of different requests with some degree of parallelism should help mitigate the timing penalty hit if a cache lookup 531 turns out to be a miss. Here, the degree of temporal overlap (e.g., partial or otherwise) between the memory read and the cache lookup may vary depending on implementation.

In the particular case of a pipelined memory controller and system memory (so as to be capable of servicing multiple system memory read requests in parallel), the read of a cache line's worth of information 530 to service a first request may continue in parallel with the read of compression map information 532 that is needed if the compression map lookup 531 is a miss. Methodology 557 shows such a situation in both flow chart form (subscript "1" in labels 530, 531, 532 ) and Gantt chart form (subscript "2" in labels 530, 531, 532).

Methodology 558 is applicable to the "non-duplicated" embodiment discussed above with respect to FIG. 5a. It shows that prediction (either "compressed" or "uncompressed") may be used in the case of a cache miss in performing references 514, 521; and, that the subsequent reference to the compression map 508 to check if decompression is needed is used to check the validity of the prediction. According to methodology 558, if the cache lookup results in a miss 532, the state of the requested cache line is predicted to be compressed or uncompressed. In a first embodiment, the state is conservatively predicted to be uncompressed. In another embodiment the recent history of the compression map's content is used as a basis for predicting a compressed state or an uncompressed state. The cache line is then fetched in accordance with the prediction.

For example, if the requested cache line's worth of information corresponds to an upper block and is predicted to be in a compressed state, a cache line's worth of information is read from the address of the lower block 533. Contrarily, if the predicted state of the cache line's worth of information is uncompressed, a cache line's worth of information is read 533 from the address of the upper block. The appropriate portion of the compression map is then fetched from system memory 534 (because miss 532 indicates that the compression map does not contain information for the applicable cache line's worth of information). The proper compression map information is then checked to see if the prediction was correct 535. If so, the remaining read request processes are performed. In a further embodiment, a compression map cache update for another request may occur after execution of inquiry 532 but before the execution of box 534. If so, box 534 may instead correspond to a "re-look" into the compression map; and, if a hit occurs, a fetch to system memory for compression map information may be eliminated altogether.

MEMORY CONTROLLER EMBODIMENTS

Figure 6A:
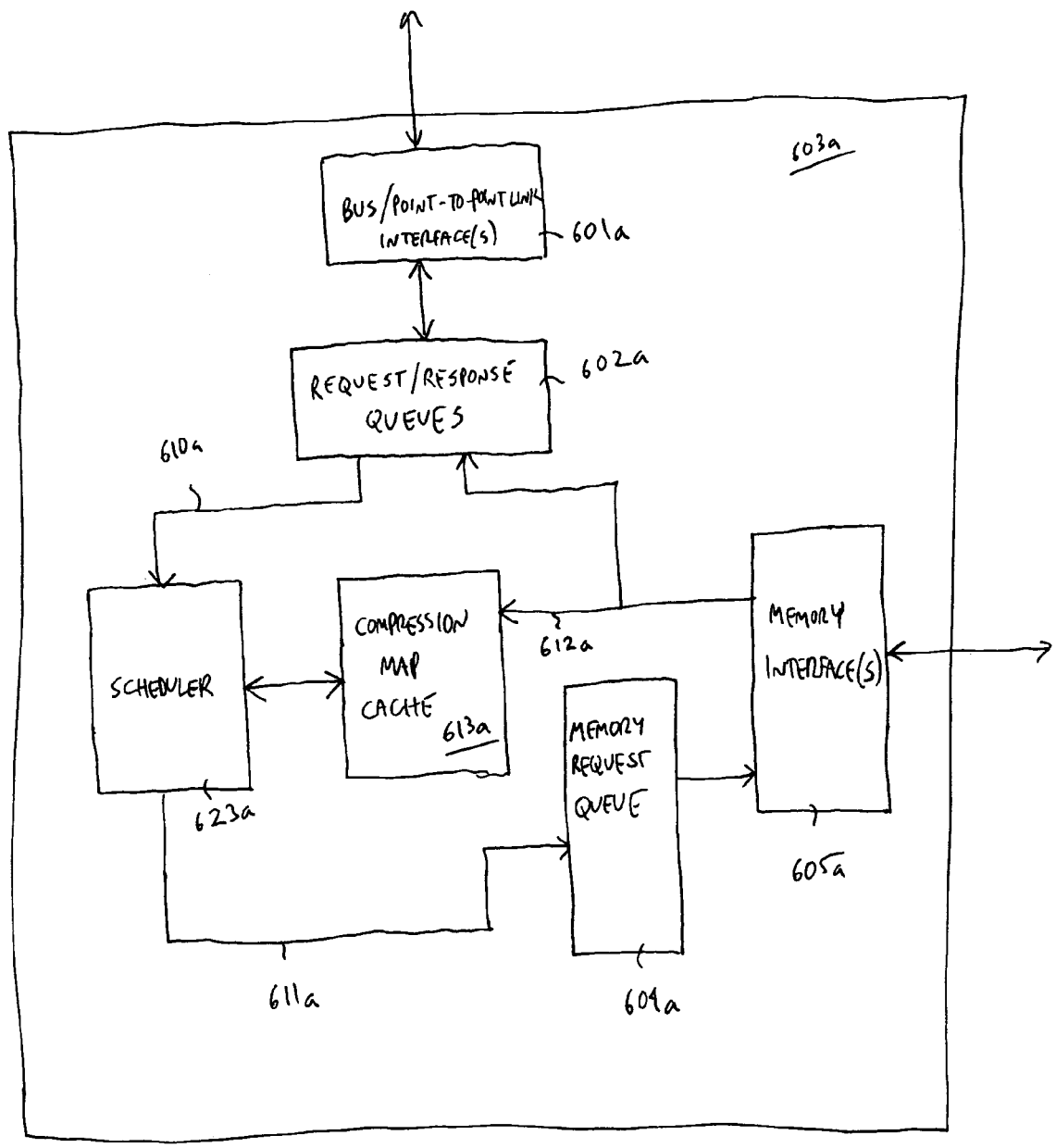
FIG. 6a shows a first embodiment of a memory controller.
Figure 6B:
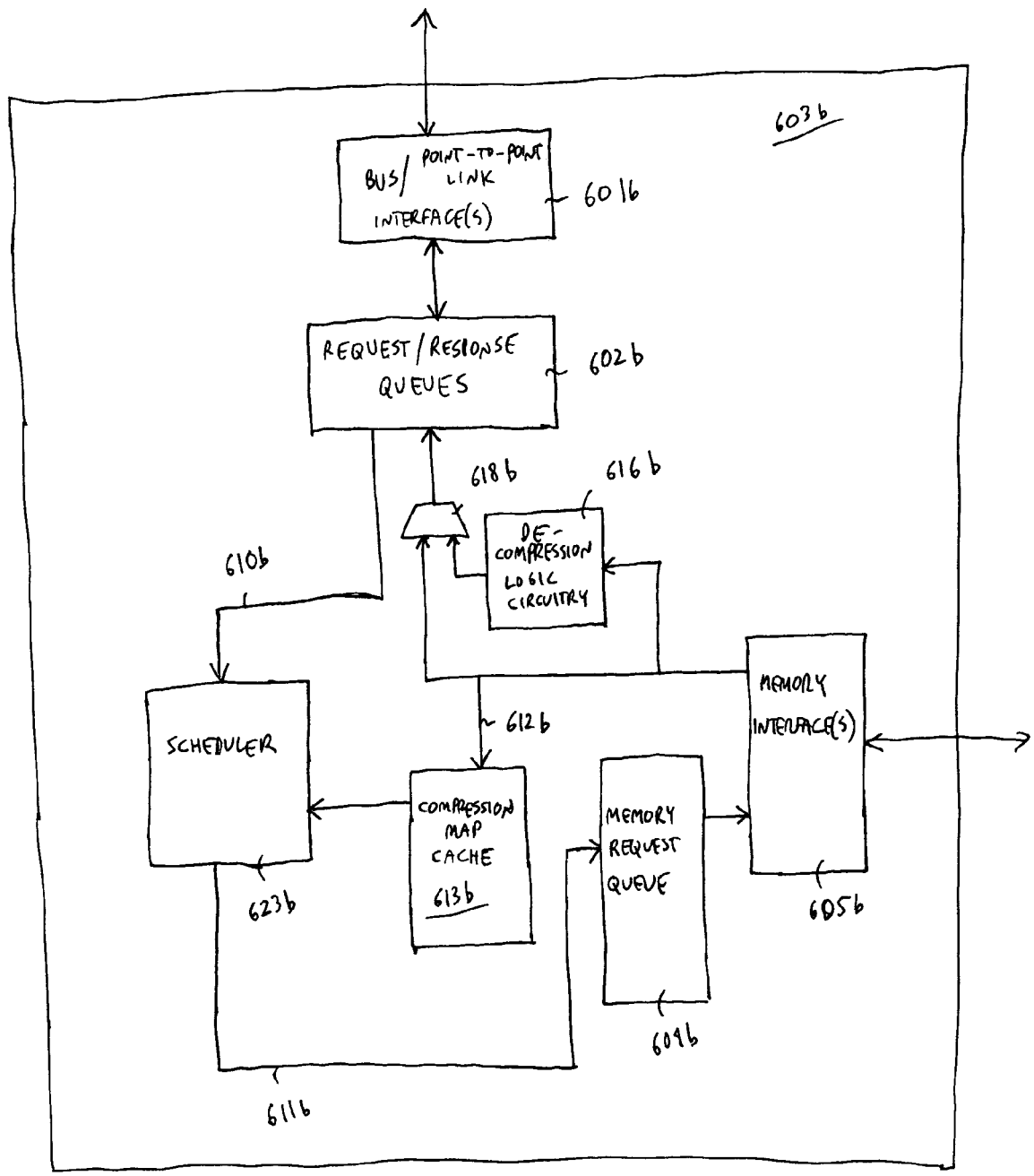
FIG. 6b shows a second embodiment of a memory controller.
Figure 6C:
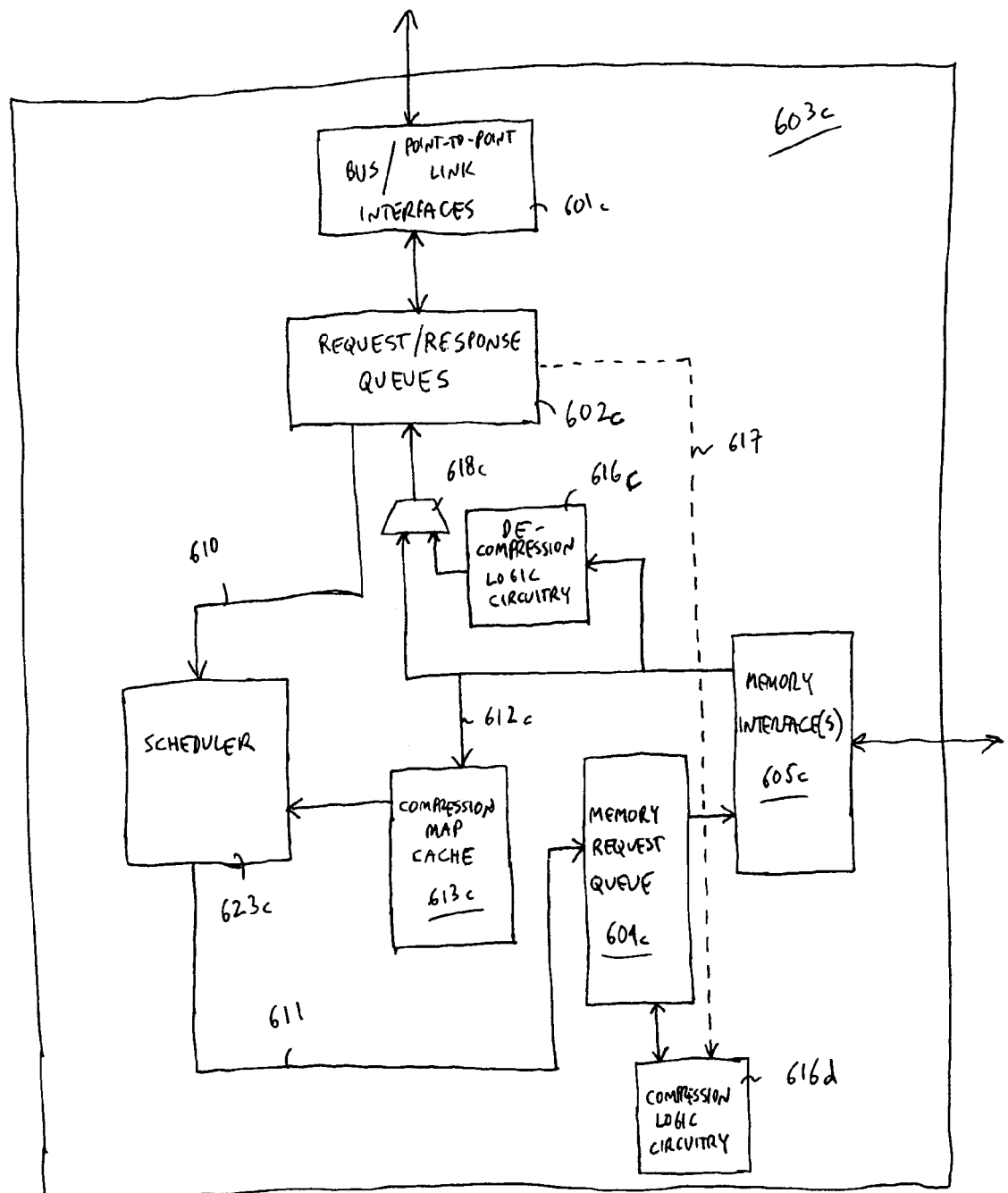
FIG. 6c shows a third embodiment of a memory controller.

FIGS. 6a through 6c show various memory controller embodiments 603a, 603b, 603c; where, each memory controller embodiment 603 includes a compression map cache 613a, 613b, 613c. Embodiment 613a does not include any compression or decompression logic circuitry. Embodiment 613b includes decompression circuitry 616b. Embodiment 613c includes compression logic circuitry 616d and decompression logic circuitry 616c. For each of the embodiments 613a, 603b, 603c, the bus/point-to-point link interface(s) 601 correspond to an interface of the memory controller where: 1) requests for memory reads and memory writes are received; 2) responses to the requests are provided. Because requests may conceivably be received from and responded to over a bus (e.g., a front side multidrop bus); and/or, received from and responded over a point-to-point link (e.g., a first inbound link that receives requests and a second outbound link that sends responses), interface 601 may be interface to a bus and/or point-to-point link.

The request/response queues 602 of each embodiment 603a, 603b, 603c queue requests in the inbound direction (e.g., in a first, request queue). The scheduler logic circuitry 623 of each embodiment 603a, 603b, 603c schedules the servicing of these requests. The memory request queue 604 of each embodiment 603a, 603b, 603c queues requests that have been scheduled by the scheduler logic circuitry 623. The memory interface 605 of each embodiment 603a, 603b, 603c is responsible for reading/writing information from/to the particular type of memory that the memory controller is coupled to. The request/response queues 602 of each embodiment 603a, 603b, 603c also queue responses to requests in the outbound direction (e.g., in a second, response queue).

In various embodiments, the updates or references 502, 505, 514, 521 discussed above may be performed by the scheduler logic circuitry (or from some other appropriate location). For each of embodiments 603a, 603b, 603c, input 612 to the compression map cache 613 can be viewed in a first instance as an input that supplies compression map information from the external memory to the compression map (e.g., in the case of a compression map cache miss). Moreover, input 612 can be viewed in a second instance as the reference to the compression map information that is performed in association with a read of a cache line's worth of information from system memory.

Here, recall from the above discussion of methodology 553 of FIG. 5b that if the memory controller is capable of performing decompression—e.g., embodiments 603b, 603c apply—the compression map is referred to 508. If the read data is compressed, multiplexer 618 selects the output of the decompression logic circuitry 616b, 616c (noting that the input to the decompression logic circuitry is along a data path output of the memory interface(s) 605b, 605c). If the read data is not compressed, the multiplexer selects a data path that flows from the memory interface 605b, 605c without the decompression logic circuitry being invoked along the way.

FIG. 6c shows an embodiment that includes compression logic circuitry 616d as well as decompression logic circuitry 616c. The compression logic circuitry 616d is shown coupled to a memory request queue 604c. As such, any compressible companion lines worth of information that are observed (or referenced) in the memory request queue 604c can be compressed together before being written into system memory. Line 617 indicates that, additionally, any cache line's worth of information waiting to be written into system memory may be compressed with its companion even if its companion is located (or referenced) in a request queue or a response queue. Additionally or in the alternative, compression logic circuitry may be coupled to the request/response queues 602b, 603c.

Cache Capable of Compressing/Decompressing Information

Figure 7A:
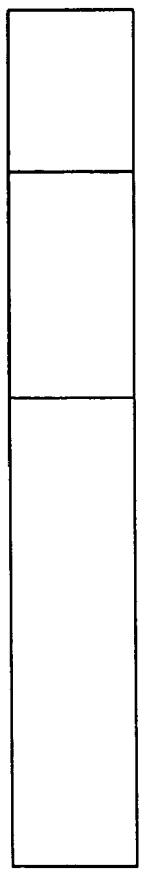
FIG. 7a illustrates a traditional memory address implemented in an cache.
Figure 7B:
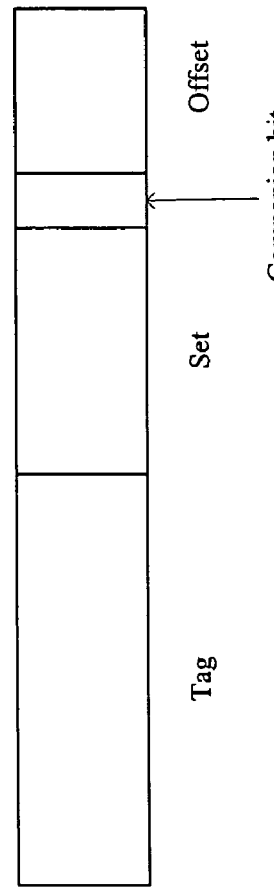
FIG. 7b illustrates one embodiment of a memory address implemented in a cache capable of compressing/decompressing cache lines' worth of information.

FIG. 7A illustrates an exemplary memory address implemented in an traditional cache. In a traditional cache, an address is divided according to tag, set and offset components. The set component is used to select one of the sets of lines. Similarly, the offset component is the low order bits of the address that are used to select bytes within a line. FIG. 7B illustrates one embodiment of a memory address implemented for lookup in a cache capable of working with compressed information (hereinafter a "compressed cache"). FIG. 7B shows the implementation of a companion bit used to map companion lines of information into the same set. The companion bit is used in instances where a line of information is not compressed. Accordingly, if a line of information is not compressed, the companion bit indicates which of the two compressed companion lines of information are to be used.

In one embodiment, the window of address bits that are used for set selection is shifted to the left by one so that the companion bit lies between the set selection and byte offset bits. In this way, companion lines map to the same cache set since the companion bit and set selection bits do not overlap.

The companion bit, which now is no longer part of the set selection bits, becomes part of the tag, though the actual tag size does not increase. In a traditional uncompressed cache, the companion bit is a part of the address and is used in set selection to determine whether an address hashes to an odd or even cache set.

Figure 8:
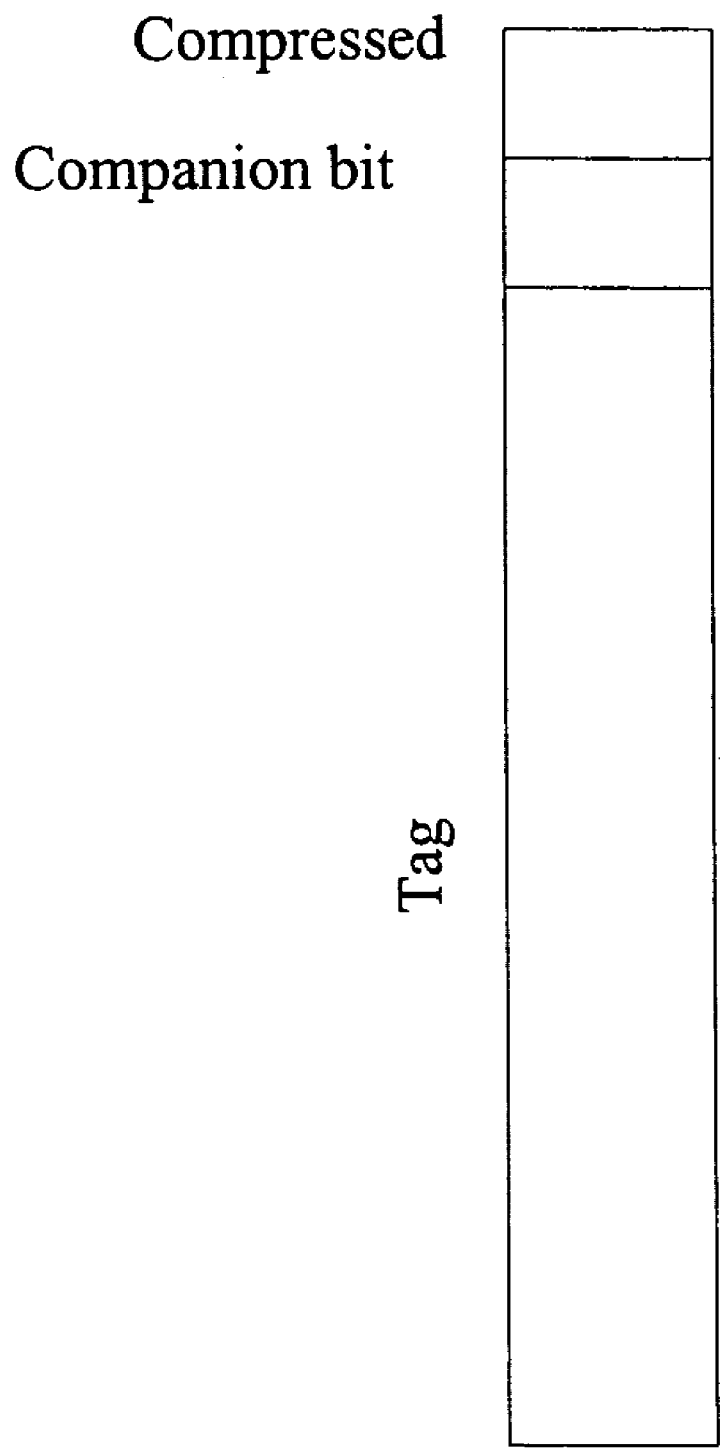
FIG. 8 illustrates one embodiment of a tag array entry for a cache capable of compressing/decompressing cache lines' worth of information.

FIG. 8 illustrates one embodiment of a tag array entry for a compressed cache. The tag array entries include the companion bit (e.g., as part of the address tag bits) and a compression bit. The compression bit causes the compressed cache tag to be one bit larger than a traditional uncompressed cache's tag. The compression bit indicates whether a line of information is compressed. Particularly, the compression bit specifies how to deal with the companion bit. If the compression bit indicates a line of information is compressed, the companion bit is treated as a part of the offset because the line is a compressed pair. If the compression bit indicates no compression, the companion bit is considered as a part of the tag array and ignored as a part of the offset.

Figure 9:
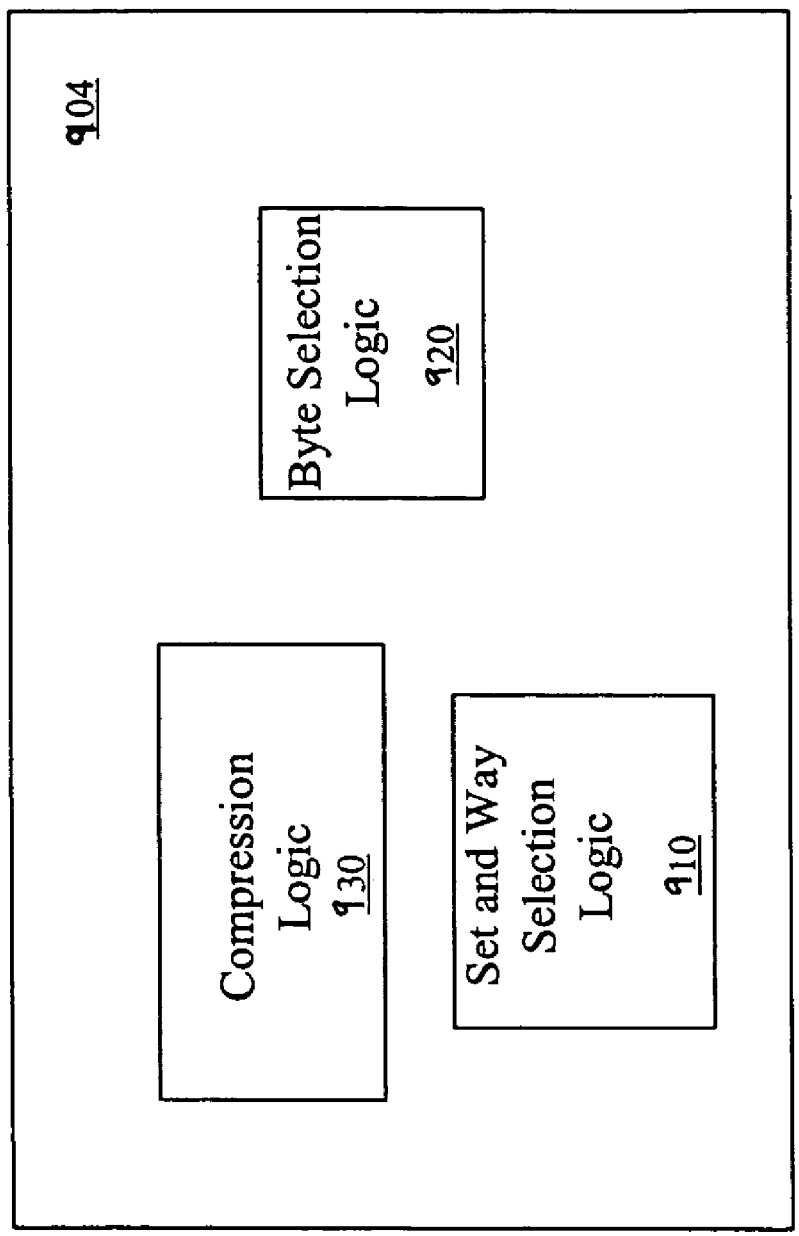
FIG. 9 is a block diagram illustrating one embodiment of a cache controller.
Figure 10:
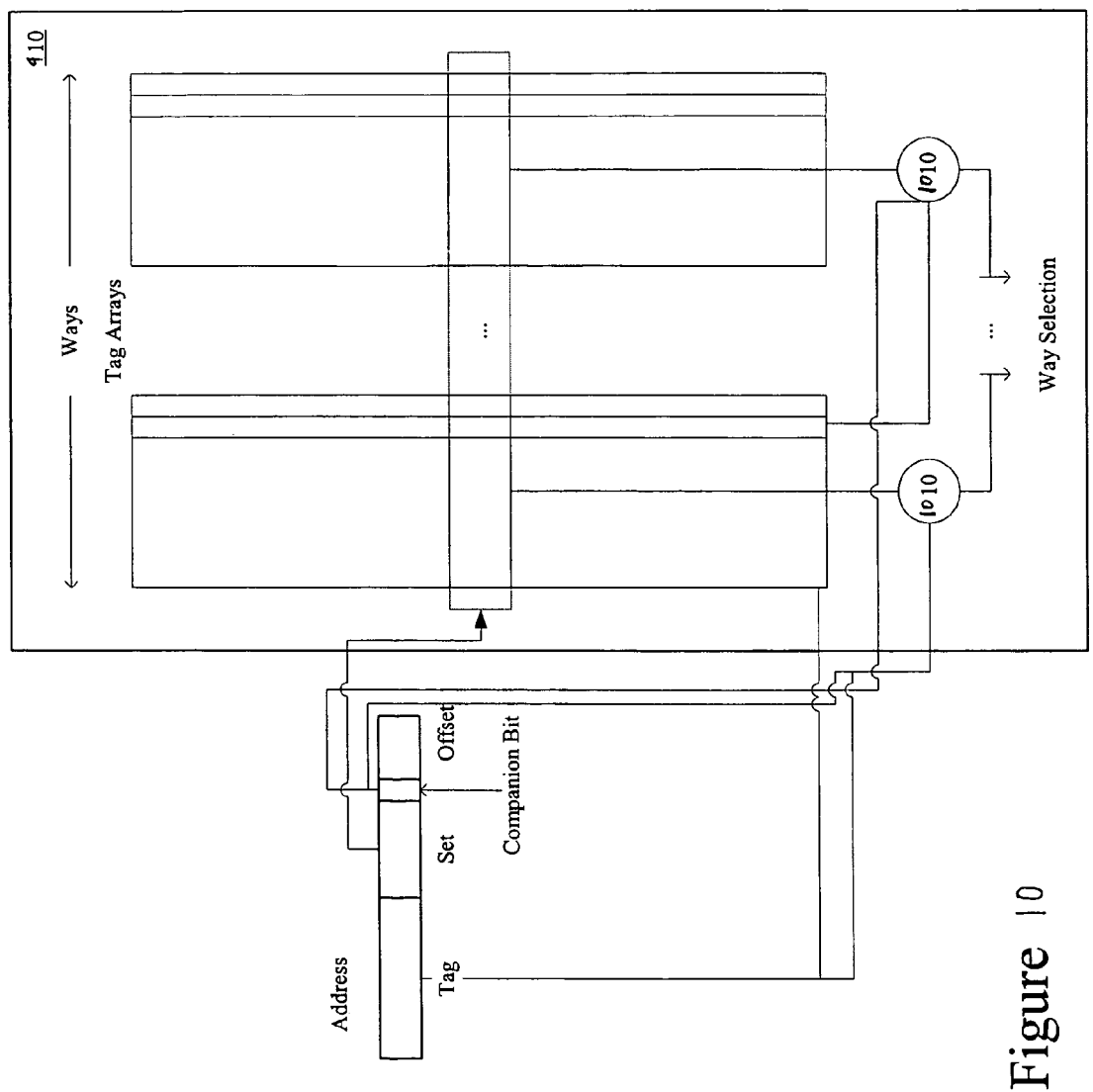
FIG. 10 illustrates one embodiment of a set and way selection mechanism in a cache capable of compressing/decompressing cache lines' worth of information.

FIG. 9 is a block diagram illustrating one embodiment of cache controller 904. Cache controller 904 includes set and way selection logic 910, byte selection logic 920 and compression logic 930. Set and way selection logic 910 is used to select cache lines within a compressed cache. FIG. 10 illustrates one embodiment of set and way selection logic 910 in a compressed cache. Referring to FIG. 10, set and way selection logic 910 includes tag comparison logic 1010 that receives input from a tag array to select a cache line based upon a received address. The tag comparison logic 1010 takes into account whether a cache line holds compressed data.

Because cache lines can hold a variable data size, tag comparison logic 1010 is also variable length, depending on whether a particular line is compressed or not. Therefore, the tag match takes into account the compression bit. When compressible by at least 2:1, the two sectors of each line are stored in a single physical cache line (e.g., in one way). It is important to note that this differs from traditional sectored cache designs in that different logical sectors of a given logical line may be stored simultaneously in different ways when uncompressed.

Figure 11:
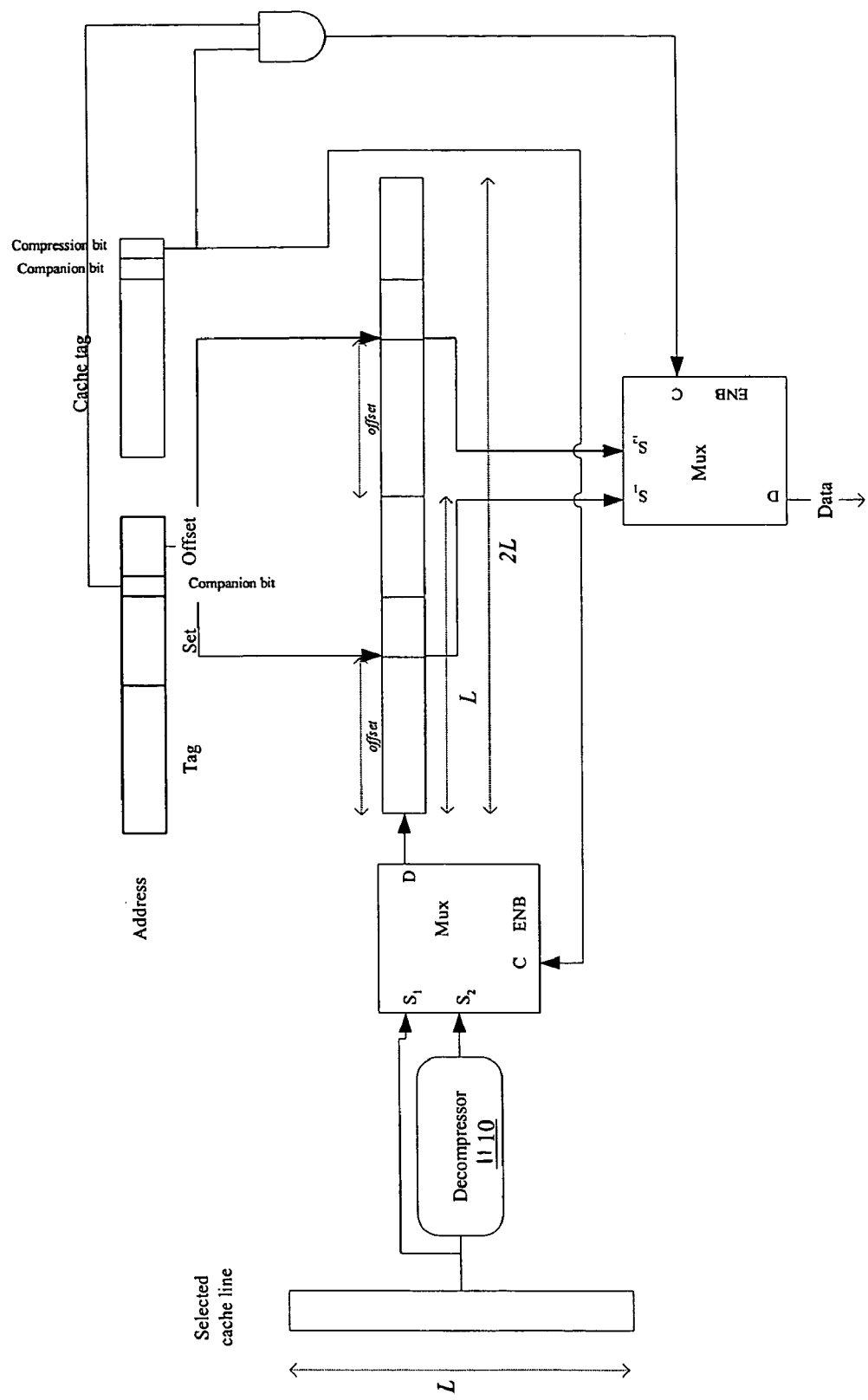
FIG. 11 illustrates one embodiment of byte selection logic.

According to FIG. 9, byte selection logic 920 selects the addressed datum within a line. According to one embodiment, byte selection logic 920 depends on the compression bit. FIG. 11 illustrates one embodiment of byte selection logic 920. Byte selection logic 920 includes a decompressor 1110 to decompress a selected cache line if necessary. An input multiplexer selects between a decompressed cache line's worth of information and an uncompressed cache line's worth of information depending upon the compression bit. In one embodiment, the range of the offset depends on whether the line of information is compressed.

If the line of information is compressed, the companion bit of the address is used as the high order bit of the offset. If the line of information is not compressed, decompressor 1110 is bypassed and the companion bit of the address is not used for the offset. The selected line is held in a buffer whose size is twice the physical line size to accommodate compressed data. Alternative embodiments may choose to use the companion bit to select which half of the decompressed word to store in a buffer whose length is the same as the physical line size. However, buffering the entire line of information is convenient for modifying and recompressing data after writes to the cache.

Compression logic 930 may also be used to determine when a line of information is to be compressed. According to one embodiment, opportunistic compression is used to determine when a line of information is to be compressed. The above-described mechanism allows any two cache line's worth of information that map to the same set and that differ only in their companion bit to be compressed together into one cache line. In one embodiment, the mechanism modifies the set mapping function and selects the companion bit such that it allows adjacent memory lines of information to be compressed together, which takes advantage of spatial locality.

Closing Comments

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Computing unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory controller for use in a system having a program-addressable memory controlled by the memory controller and a processor coupled with the memory by an external bus, the memory controller comprising a compression map cache to store information that identifies a compressed cache line's worth of information stored in the memory, the compressed cache line's worth of information comprising a compressed version of a first cache line's worth of information and a compressed version of a second cache line's worth of information, said memory controller including storage space to identify physical continuous addressing space of the program addressable memory in which a compression map is stored.

2. The memory controller of claim 1, wherein the information comprises a bit for each block of a plurality of blocks of memory space of the memory, wherein each of the plurality blocks stores its own cache line's worth of information, the bit to indicate whether its corresponding block is storing a compressed cache line's worth of information.

3. The memory controller of claim 2, wherein, when all bits of the corresponding block is storing a same value, the value is identified in the information.

4. The memory controller of claim 3, wherein the value is a value of 0.

5. The memory controller of claim 1, wherein the information comprises a bit for each macro block of a plurality of macro blocks of memory space of the memory, where each macro block of memory space of the memory stores a cache lines' worth of information for a set of companion cache lines' worth of information, the bit to indicate whether the companion cache lines' worth of information of its corresponding macro block have been compressed.

6. The memory controller of claim 5, wherein, when all bits of the compressed companion cache lines' worth of information are storing a same value, the value is identified in the information.

7. The memory controller of claim 6, wherein the value is a value of 0.

8. The memory controller of claim 1, wherein the storage space is to be written to by a computing system's BIOS.

9. The memory controller of claim 1 further comprising a scheduler to schedule requests made to the memory controller, the scheduler coupled to the compression map cache to refer to the information to determine whether a request's corresponding cache line's worth of information is stored in the memory in a compressed state.

10. The memory controller of claim 1 further comprising a first read path that flows through decompression logic circuitry and a second read path that bypasses the decompression logic circuitry, the decompression logic circuitry to decompress a compressed cache line's worth of information that has been read from the memory when a request's corresponding cache line's worth of information is stored in memory in a compressed state.

11. The memory controller of claim 1 further comprising compression logic circuitry coupled to a queue for queuing the requests, the compression logic circuitry to compress an uncompressed cache line's worth of information with a companion of the uncompressed cache line's worth of information.

12. The memory controller of claim 11, wherein the compression logic circuitry is further coupled to a second queue for queuing responses to the requests.

13. A processor and a memory controller integrated on a same semiconductor die, the memory controller controlling a program-addressable memory coupled with the processor by an external bus, the memory controller comprising a compression map cache to store information that identifies a compressed cache line's worth of information stored in the memory, the compressed cache line's worth of information comprising a compressed version of a first cache line's worth of information and a compressed version of a second cache line's worth of information, the memory controller including a scheduler to schedule requests made to the memory controller, the scheduler coupled to the compression map cache to refer to the information so that it can be understood whether a request's corresponding cache line's worth of information is stored in the program addressable memory in a compressed state.

14. The processor and memory controller of claim 13, wherein the information comprises a bit for each block of a plurality of blocks of memory space of the memory, each block of memory space of the memory to store its own cache line's worth of information, the bit to indicate whether its corresponding block is storing a compressed cache line's worth of information.

15. The processor and memory controller of claim 14, wherein, when all bits of the corresponding block is storing a same value, the value is identified in the information.

16. The processor and memory controller of claim 15, wherein the value is a value of 0.

17. The processor and memory controller of claim 15, wherein the value is a value of 0.

18. The processor and memory controller of claim 13, wherein the information comprises a bit for each macro block of a plurality of macro blocks of memory space of the memory, each macro block of memory space of the memory to store cache lines' worth of information for a set of companion cache lines' worth of information, the bit to indicate whether the companion cache lines' worth of information of its corresponding macro block have been compressed.

19. The processor and memory controller of claim 18, wherein, when all bits of the compressed companion cache lines' worth of information are storing a same value, the value is identified in the information.

20. The processor and memory controller of claim 13 further comprising memory space to identify physical continuous addressing space of the memory in which a compression map is stored.

21. The processor and memory controller of claim 20, wherein the memory space is to be written to by a computing system's BIOS.

22. The processor and memory controller of claim 13 further comprising a first read path that flows through decompression logic circuitry and a second read path that bypasses the decompression logic circuitry, the decompression logic circuitry to decompress a compressed cache line's worth of information that has been read from the memory when a request's corresponding cache line's worth of information is stored in the memory in a compressed state.

23. The processor and memory controller of claim 13 further comprising compression logic circuitry coupled to a queue for queuing the requests, the compression logic circuitry to compress an uncompressed cache line's worth of information with a companion of the uncompressed cache line's worth of information.

24. The processor and memory controller of claim 23, wherein the compression logic circuitry is further coupled to a second queue for queuing responses to the requests.

25. The processor and memory controller of claim 13, wherein the processor comprises a cache controller with compression logic circuitry, the compression logic circuitry to compress the first cache line's worth of information with the second cache line's worth of information to form the compressed cache line's worth of information.

26. A computing system comprising:
  a) a program-addressable memory; and
  b) a processor and a memory controller integrated on a same semiconductor die, the memory controller controlling the memory, the memory controller comprising a compression map cache to store information that identifies a compressed cache line's worth of information stored in the memory, the compressed cache line's worth of information comprising a compressed version of a first cache line's worth of information and a compressed version of a second cache line's worth of information, the memory controller including storage space to identify physical continuous addressing space of the program addressable memory in which a compression map is stored.

27. The computing system of claim 26, wherein the information comprises a bit for each block of a plurality of blocks of memory space within the memory, each block of memory space to store its own cache line's worth of information, the bit to indicate whether its corresponding block is storing a compressed cache line's worth of information.

28. The computing system of claim 27, wherein, when all bits of the corresponding block is storing a same value, the value is identified in the information.

29. The computing system of claim 28, wherein the value is a value of 0.

30. The computing system of claim 28, wherein the value is a value of 0.

31. The computing system controller of claim 26, wherein the information comprises a bit for each macro block of a plurality of macro blocks of memory space within the memory, each macro block of memory space to store cache lines' worth of information for a set of companion cache lines' worth of information, the bit to indicate whether the companion cache lines' worth of information of its corresponding macro block have been compressed.

32. The computing system of claim 31, wherein, when all bits of the compressed companion cache lines' worth of information are storing a same value, the value is identified in the information.

33. The computing system of claim 26, wherein the memory space is to be written to by the computing system's BIOS.

* * * * *